United States Patent
Webster

(10) Patent No.: US 12,145,314 B2
(45) Date of Patent: *Nov. 19, 2024

(54) METHOD OF MAKING FOOTWEAR COMPONENTS

(71) Applicant: Under Armour, Inc., Baltimore, MD (US)

(72) Inventor: James Webster, Portland, OR (US)

(73) Assignee: Under Armour, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,536

(22) Filed: Jun. 15, 2023

(65) Prior Publication Data

US 2023/0405922 A1   Dec. 21, 2023

Related U.S. Application Data

(63) Continuation of application No. 17/748,275, filed on May 19, 2022, now Pat. No. 11,701,823.
(Continued)

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 80/00* (2014.12); *B29K 2105/251* (2013.01); *B29L 2031/505* (2013.01)

(58) Field of Classification Search
CPC ....... B29C 64/165; B33Y 10/00; B33Y 80/00; B29K 2105/251; B29L 2031/505
See application file for complete search history.

(56) References Cited

U.S. PATENT DOCUMENTS

| 956,576 A | 5/1910 | Goding |
| 1,969,962 A | 8/1934 | Bodle et al. |

(Continued)

FOREIGN PATENT DOCUMENTS

| CA | 2489310 C | 11/2012 |
| CN | 1586356 A | 3/2005 |

(Continued)

OTHER PUBLICATIONS

Chinese Office Action with English translation, Application No. 201880021852.5, Mar. 3, 2021, 14 pages.
(Continued)

*Primary Examiner* — Nahida Sultana
(74) *Attorney, Agent, or Firm* — Edell, Shapiro & Finnan, LLC

(57) ABSTRACT

A method is provided of making an upper for an article of footwear, the method including applying a liquid to select portions of a first substrate sheet of material, applying a powder to the first substrate sheet of material, applying suction to the first substrate sheet of material in order to remove the powder from portions of the first substrate sheet of material that are not coated with the liquid to form a selectively powdered sheet of material, applying additional liquid, additional powder, and additional suction to additional substrate sheets of material to form a stack of selectively powdered sheets of material, using compression and heat to join the stack of selectively powdered sheets of material into a partially cured structure, and removing uncured portions of sheet material from the partially cured structure leaving a cured structure. Different portions of the cured structure can have different properties.

20 Claims, 24 Drawing Sheets

Related U.S. Application Data

(60) Provisional application No. 63/190,335, filed on May 19, 2021, provisional application No. 63/190,326, filed on May 19, 2021.

(51) Int. Cl.
*B33Y 80/00* (2015.01)
*B29K 105/00* (2006.01)
*B29L 31/50* (2006.01)

(56) References Cited

U.S. PATENT DOCUMENTS

| | | | |
|---|---|---|---|
| 2,432,174 | A | 12/1947 | Rollmann |
| 2,789,933 | A | 4/1957 | Bargmeyer |
| 3,106,729 | A | 10/1963 | Kamborian |
| 3,720,971 | A | 3/1973 | Wyness et al. |
| 4,295,238 | A | 10/1981 | Clark |
| 4,354,318 | A | 10/1982 | Frederick et al. |
| 6,299,962 | B1 | 10/2001 | Davis et al. |
| 6,845,541 | B1 | 1/2005 | Lai |
| 6,871,424 | B2 | 3/2005 | Labonte et al. |
| 7,047,668 | B2 | 5/2006 | Burris et al. |
| 8,005,558 | B2 | 8/2011 | Waatti et al. |
| 8,084,117 | B2 | 12/2011 | Lalvani |
| 8,088,315 | B2 | 1/2012 | Torres et al. |
| 8,124,549 | B2 | 2/2012 | Torres et al. |
| 8,316,561 | B2 | 11/2012 | Jia |
| 8,757,038 | B2 | 6/2014 | Siegismund |
| 8,850,723 | B2 | 10/2014 | Greene et al. |
| 9,463,481 | B2 | 10/2016 | Peng et al. |
| 9,827,754 | B2 * | 11/2017 | Swartz ................. B32B 1/00 |
| 10,241,498 | B1 * | 3/2019 | Beard ................... B33Y 50/02 |
| 10,377,080 | B2 | 8/2019 | Swartz et al. |
| 10,377,106 | B2 | 8/2019 | Swartz et al. |
| 10,827,801 | B2 | 11/2020 | Webster |
| 11,040,485 | B2 | 6/2021 | Swartz |
| 11,284,674 | B2 | 3/2022 | Webster |
| 11,701,823 | B1 * | 7/2023 | Webster ............ B29C 64/165 264/250 |
| 2001/0055684 | A1 | 12/2001 | Davis et al. |
| 2004/0168349 | A1 | 9/2004 | Cole, III |
| 2005/0142331 | A1 | 6/2005 | Anderson et al. |
| 2005/0287371 | A1 | 12/2005 | Chaudhari et al. |
| 2006/0155417 | A1 | 7/2006 | Cremaschi et al. |
| 2006/0276095 | A1 | 12/2006 | Dua et al. |
| 2008/0168684 | A1 | 7/2008 | Aly |
| 2010/0175276 | A1 | 7/2010 | Dojan et al. |
| 2010/0199520 | A1 | 8/2010 | Dua et al. |
| 2010/0286583 | A1 | 11/2010 | Torres et al. |
| 2011/0156314 | A1 | 6/2011 | Alberg et al. |
| 2011/0159758 | A1 | 6/2011 | Martin |
| 2011/0185594 | A1 | 8/2011 | Zhang et al. |
| 2012/0066931 | A1 | 3/2012 | Dojan et al. |
| 2012/0144703 | A1 | 6/2012 | Trinkaus et al. |
| 2013/0171409 | A1 | 7/2013 | Meli et al. |
| 2013/0291317 | A1 | 11/2013 | Hanson et al. |
| 2013/0305465 | A1 | 11/2013 | Siegismund |
| 2014/0059734 | A1 | 3/2014 | Toronjo |
| 2014/0101816 | A1 | 4/2014 | Toronjo |
| 2014/0109286 | A1 | 4/2014 | Blakely et al. |
| 2014/0196321 | A1 | 7/2014 | Wu et al. |
| 2014/0223671 | A1 | 8/2014 | Fisher et al. |
| 2014/0237738 | A1 | 8/2014 | Johnson et al. |
| 2014/0237853 | A1 | 8/2014 | Fisher et al. |
| 2014/0283410 | A1 | 9/2014 | Marvin et al. |
| 2015/0007451 | A1 | 1/2015 | Bruce |
| 2015/0013187 | A1 | 1/2015 | Taniguchi et al. |
| 2015/0282564 | A1 | 10/2015 | Meschter et al. |
| 2015/0282565 | A1 | 10/2015 | Kilgore |
| 2016/0166010 | A1 | 6/2016 | Bruce et al. |
| 2016/0166011 | A1 | 6/2016 | Bruce et al. |
| 2016/0168774 | A1 | 6/2016 | Breithaupt et al. |
| 2016/0206049 | A1 | 7/2016 | Kallayil |
| 2017/0035147 | A1 | 2/2017 | Farris et al. |
| 2017/0071291 | A1 | 3/2017 | Follet |
| 2017/0156443 | A1 | 6/2017 | Guyan et al. |
| 2017/0238659 | A1 | 8/2017 | Bohnsack et al. |
| 2018/0072001 | A1 * | 3/2018 | Swartz ................. B32B 5/26 |
| 2018/0103728 | A1 * | 4/2018 | Koo ..................... B41M 3/00 |
| 2018/0126668 | A1 | 5/2018 | El-Siblani et al. |
| 2018/0148861 | A1 | 5/2018 | Tarrier et al. |
| 2018/0242690 | A1 | 8/2018 | Webster |
| 2018/0263339 | A1 | 9/2018 | Neumann et al. |
| 2018/0317606 | A1 | 11/2018 | Schneider et al. |
| 2018/0333903 | A1 | 11/2018 | Condon et al. |
| 2018/0352893 | A1 | 12/2018 | Cross et al. |
| 2019/0152149 | A1 | 5/2019 | Arayama |
| 2019/0252291 | A1 | 8/2019 | Huitink et al. |
| 2019/0359893 | A1 * | 11/2019 | Mandan ................. C07C 1/00 |
| 2021/0291437 | A1 * | 9/2021 | Swartz ................. C22C 47/025 |
| 2022/0295943 | A1 * | 9/2022 | Webster ............ A43B 23/0245 |

FOREIGN PATENT DOCUMENTS

| | | |
|---|---|---|
| DE | 2801984 A1 | 7/1979 |
| SU | 1639603 A1 | 4/1991 |
| WO | 2016093956 A1 | 6/2016 |
| WO | 2017023524 A1 | 2/2017 |

OTHER PUBLICATIONS

European Search Report, EP18761178, Nov. 18, 2020, 12 pages.
Hodakel, "What is Sympatex Fabric: Properties, How its Made and Where", https://sewport.com/fabrics-directory/sympatex-fabric. accessed Oct. 17, 2019, 24 pages.
PCT International Search Report and Written Opinion. PCT/US2018/020151, dated Aug. 2, 2018, 6 pages.

* cited by examiner

METHOD OF MAKING FOOTWEAR COMPONENTS

CROSS-REFERENCE TO RELATED APPLICATIONS

This application is a continuation of U.S. patent application Ser. No. 17/748,275, filed May 19, 2022, which claims priority from U.S. Provisional Patent Application Ser. No. 63/190,326, filed May 19, 2021, and from U.S. Provisional Patent Application Ser. No. 63/190,335, filed May 19, 2021, the disclosures of which are incorporated herein by reference in their entireties.

BACKGROUND

Attempts are being made to expedite production of many consumer goods by using additive manufacturing, such as 3D printing. In the case of footwear, additive manufacturing is limited to single materials, and thus, the ability to vary the properties of different portions of a footwear component is restricted. While separate components can be 3D printed of different materials and then joined together, it would be desirable to additively manufacture footwear components in a manner that enables different portions of the same component to have different properties.

The present disclosure is directed to methods of additive manufacturing for articles of footwear that address at least some of the limitations and considerations discussed above.

SUMMARY

In example embodiments, a method of making an upper for an article of footwear comprises applying a liquid to select portions of a first substrate sheet of material, applying a powder to the first substrate sheet of material, applying suction to the first substrate sheet of material in order to remove the powder from portions of the first substrate sheet of material that are not coated with the liquid to form a selectively powdered sheet of material, applying additional liquid, additional powder, and additional suction to additional substrate sheets of material to form a stack of selectively powdered sheets of material, using compression and heat to join the stack of selectively powdered sheets of material into a partially cured structure, and removing uncured portions of sheet material from the partially cured structure leaving a cured structure. Different portions of the cured structure have different properties.

The applying powder to one or more substrate sheets can comprise applying two or more powders comprising different polymers to the different portions.

The cured structure can be a substantially flat flexible sheet. Alternatively, the cured structure can also have a three-dimensional shape that defines an upper. The cured structure can further include a plurality of nested uppers for a plurality of articles of footwear.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, with emphasis instead being placed upon illustrating the principles of the embodiments. Moreover, in the figures, like reference numerals designate corresponding parts throughout the different views.

DETAILED DESCRIPTION

Figure 1:
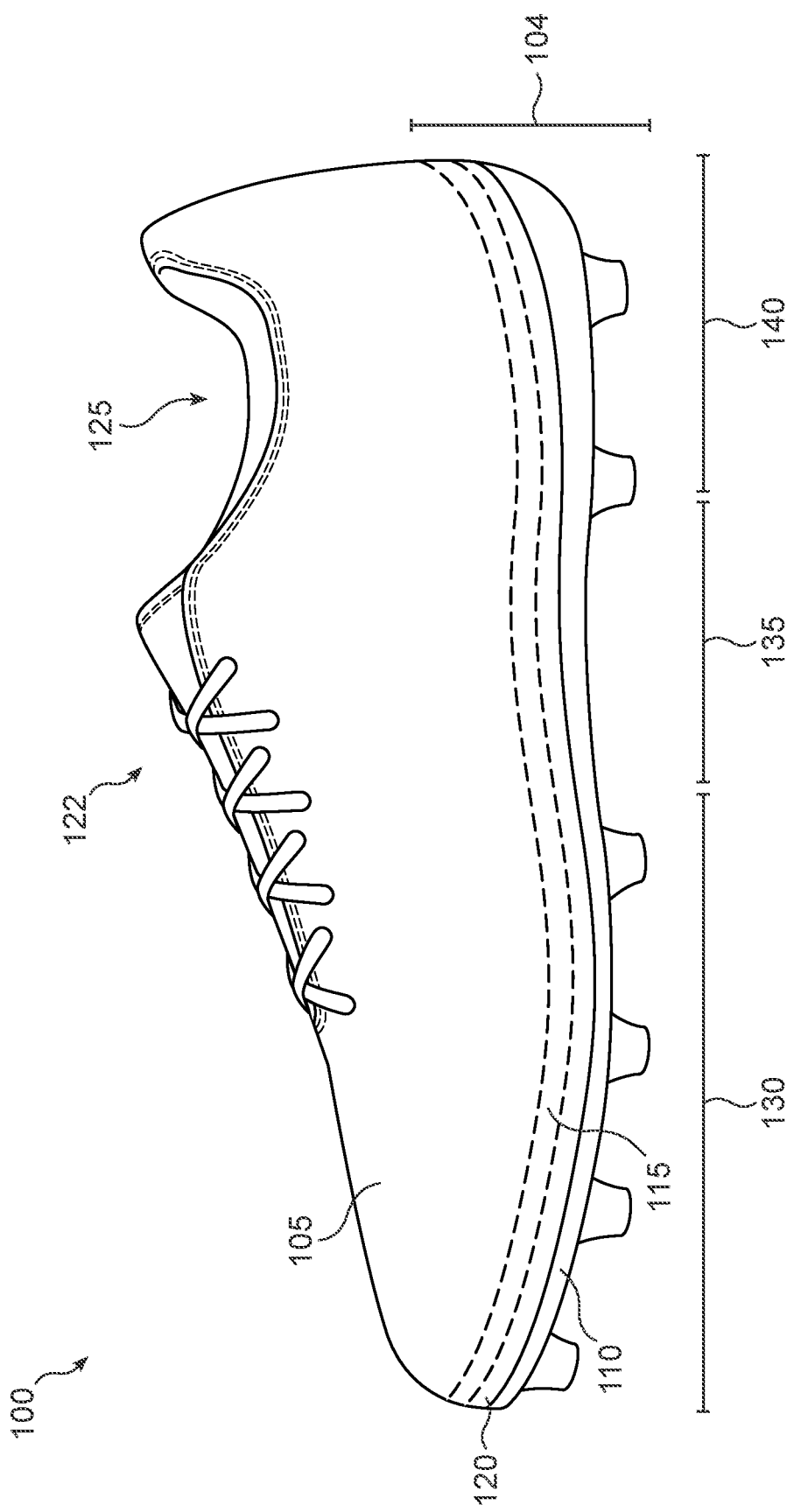
FIG. 1 is a schematic view of an embodiment of an article of footwear.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

The present disclosure may be relevant to a variety of articles of footwear, including, but are not limited to, hiking boots, soccer shoes, football shoes, sneakers, running shoes, cross-training shoes, rugby shoes, basketball shoes, baseball shoes as well as other kinds of shoes. Moreover, in some embodiments, components may be configured for various kinds of non-sports-related footwear, including, but not limited to, slippers, sandals, high-heeled footwear, loafers as well as any other kinds of footwear.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

In accordance with embodiments described herein, methods of forming an upper for an article of footwear are described herein, where a plurality of substrate sheets are combined to form the upper. In some example embodiments, the plurality of substrate sheets can be combined to form a single upper. In other example embodiments, the plurality of substrate sheets can be combined to simultaneously form a plurality of uppers (e.g., where the plurality of uppers includes a nested configuration of uppers). Further, in certain embodiments, the plurality of substrate sheets combine to form a generally planar stacked structure (e.g., a blank) that defines a thickness (in the stacked direction) of the flat upper, where the generally planar stacked structure is then manipulated (e.g., placed around a shoe last) to form the three-dimensional features of the upper. In other embodiments, the plurality of substrate sheets combine to form the upper having its three-dimensional shape.

FIG. 1 illustrates an article of footwear 100 manufactured by any of the methods described below. The various components of footwear 100 are described below for purposes of general reference. For example, footwear 100 may include an upper 105 configured to enclose, or substantially enclose the foot of a wearer. In addition, footwear 100 may include a sole structure 104 secured to the bottom portion of footwear 100 and configured to contact the ground. As shown in FIG. 1, in some embodiments, sole structure 104 may include an outsole 110, which may be fixedly attached directly to upper 105. For example, in cleated shoes, such as the exemplary footwear 100, the sole layering may be minimized, and thus, outsole 110 may be directly attached to upper 105. In some cases, such a cleated outsole may be referred to as a "soleplate." In other embodiments, footwear 100 may include a midsole (not shown), which may include various structural components, such as one or more cushioning elements. In addition, as shown in FIG. 1, sole structure 104 may include an insole (or "sockliner") 115. Insole 115 may include minimal cushioning and may provide a generally soft surface with which the foot of the wearer may interface.

Also, in some embodiments, sole structure 104 may include an additional structural component, such as a support plate 120. Support plate 120 may provide properties targeted to particular areas of the foot. For example, support plate 120 may be relatively rigid in certain areas of the foot, and relatively flexible in other regions of the foot.

As illustrated in FIG. 1, article of footwear 100 may be divided into three regions: forefoot region 130, midfoot region 135, and heel region 140. Forefoot region 130 may be generally associated with the toes and joints connecting the metatarsals with the phalanges. Midfoot region 135 may be generally associated with the arch of a foot, including the instep. Likewise, heel region 140 or "hindfoot" may be generally associated with the heel of a foot, including the calcaneus bone.

For purposes of this disclosure, the following directional terms, when used in reference to an article of footwear, shall refer to the article of footwear when sitting in an upright position, with the sole facing the ground, that is, as it would be positioned when worn by a wearer standing on a substantially level surface.

The term "longitudinal," as used throughout this detailed description and in the claims, refers to a direction extending along the length of a component. For example, a longitudinal direction of an article of footwear extends from forefoot region 130 to heel region 140 of article of footwear 100. The term "forward" or "front" is used to refer to the general direction in which the toes of a foot point, and the term "rearward" or "back" is used to refer to the opposite direction, i.e., the direction in which the heel of the foot is facing.

The term "lateral direction," as used throughout this detailed description and in the claims, refers to a side-to-side direction extending along the width of a component. In other words, the lateral direction may extend between a medial side and lateral side of footwear 100, with the lateral side of footwear 100 being the surface that faces away from the other foot, and the medial side being the surface that faces toward the other foot.

The term "vertical," as used throughout this detailed description and in the claims, refers to a direction generally perpendicular to both the lateral and longitudinal directions. For example, in cases where an article of footwear is planted flat on a ground surface, the vertical direction may extend from the ground surface upward. It will be understood that each of these directional adjectives may be applied to individual components of an article of footwear. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

It will be understood that the forefoot region, the midfoot region, and the heel region are only intended for purposes of description and are not intended to demarcate precise regions of an article of footwear. For example, in some cases, one or more of the regions may overlap. Likewise, the medial side and the lateral side are intended to represent generally two sides, rather than precisely demarcating an article of footwear into two halves. In addition, the forefoot region, the midfoot region, and the heel region, as well as the medial side and the lateral side, may also be applied to individual components of an article of footwear, including a sole structure, an upper, a lacing system, and/or any other component associated with the article.

Upper 105 and the sole structure may define an internal cavity. The "interior" of an article of footwear refers to space in this internal cavity that is occupied by a wearer's foot when the article of footwear is worn. The "inner side" or "inside" of an element refers to the face of that element that is (or will be) oriented toward the internal cavity in a completed article of footwear. The "outer side," "outside," or "exterior" of an element refers to the face of that element that is (or will be) oriented away from the internal cavity in the completed article of footwear 100. In some cases, the inner side of an element may have other elements between that inner side and the interior in the completed article of footwear 100. Similarly, an outer side of an element may have other elements between that outer side and the space external to the completed article of footwear 100. Further, the terms "inward" and "inwardly" shall refer to the direction toward the interior of the article of footwear, and the terms "outward" and "outwardly" shall refer to the direction toward the exterior of article of footwear 100.

For purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" shall refer to the joining of two components in a manner such that the two components are secured together, but may be readily detached from one another. Examples of removable attachment mechanisms may include hook and loop fasteners, friction fit connections, interference fit connections, threaded connectors, cam-locking connectors, and other such readily detachable connectors. Similarly, "removably disposed" shall refer to the assembly of two components in a non-permanent fashion.

Upper 105 provides a covering for the wearer's foot that comfortably receives and securely positions the foot with respect to the sole structure. In general, as shown in FIG. 1, upper 105 includes an opening 125 that provides entry for the foot into an interior cavity of upper 105 in heel region 140. An upper may be of a variety of styles depending on factors such as desired use and required ankle mobility. For example, an athletic shoe with an upper having a "low-top" configuration extending below the ankle that is shaped to provide high mobility for an ankle. An upper could be configured as a "high-top" upper extending above the wearer's ankle for basketball or other activities, or as a "mid-top" configuration extending to about the wearer's ankle. Furthermore, an upper may also include non-athletic shoes, such as dress shoes, loafers, sandals, and work boots.

Upper 105 may also include other known features in the art including a tongue, heel tabs, loops, etc. In some embodiments, upper 105 may include a fastener on a fastening region of the upper. For example, the fastening provision may be lacing system 122, or "lace," applied at a fastening region of upper 105. Other kinds of fastening provisions, include, but are not limited to, laces, cables, straps, buttons, zippers as well as any other provisions known in the art for fastening articles. For a lacing system, the fastening region may comprise one or more eyelets. The fastening region may comprise one or more tabs, loops, hooks, D-rings, hollows, or any other provisions known in the art for fastening regions.

Sole structure 104 is positioned between a foot of a wearer and the ground, and may incorporate various component elements. Upper 105 and sole structure 104 may be coupled using any conventional or suitable manner, such as adhesion or bonding, via a woven connection, via one or more types of fasteners, etc. In some cases, a sole structure and an upper may be combined together in a single unitary construction.

Sole structure 104 may contact a ground surface and have various features to deal with the ground surface. Examples of ground surfaces include, but are not limited to, indoor ground surfaces such as wood and concrete floors, pavement, natural turf, synthetic turf, dirt, as well as other surfaces. In some cases, the lower portions of sole structure 104 may include provisions for traction, including, but not limited to, traction elements, studs, and/or cleats.

Sole structure 104 may be made of a variety of any suitable material or pluralities of materials for a variety of functions. For example, one or more components of sole structure 104, such as the midsole, may be formed from a polymer foam (e.g., a polyurethane or ethylvinylacetate foam) material that attenuates ground reaction forces (i.e., provides cushioning) during walking, running, and other ambulatory activities. In addition, the components of a sole may also include gels, fluid-filled chambers, plates, moderators, inserts, or other elements that further attenuate forces, enhance stability, or influence the motions of the foot. In addition, the other components may have specific surface properties, such as an outsole being made from a durable material, such as carbon or blown rubber, which is further textured to impart traction. Furthermore, the insole may be made from a waterproof material such as ethylvinylacetate to prevent moisture seeping into the sole.

Figure 2:
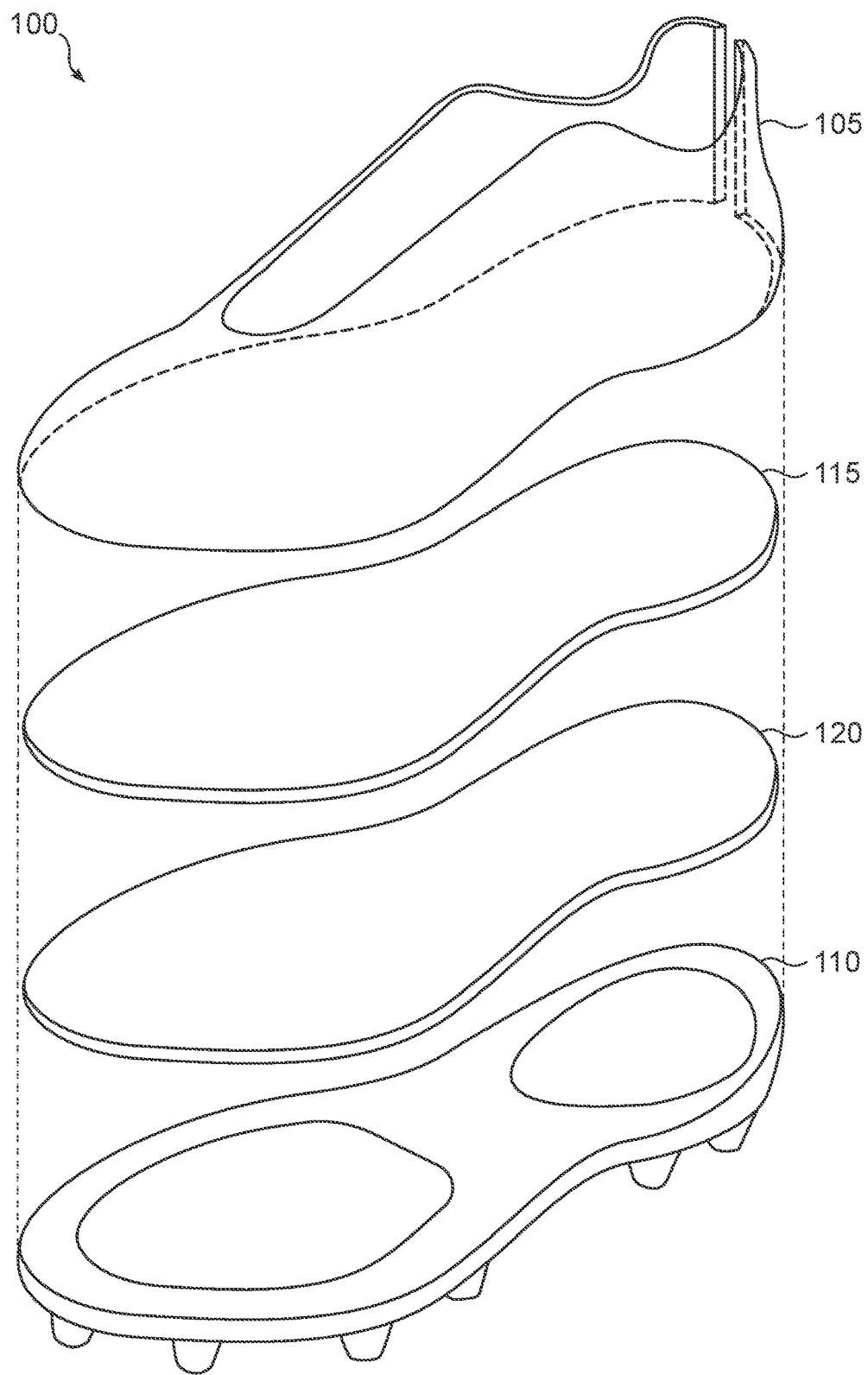
FIG. 2 is a schematic exploded view of components of an article of footwear.

FIG. 2 is a schematic exploded view of components of an article of footwear. As shown in FIG. 2, footwear 100 may include upper 105, insole 115, inner sole board 120, and soleplate 110. The present disclosure is directed to an additive manufacturing process for forming components of an article of footwear. Generally, the methods and materials below may be applicable for forming all components illustrated in FIG. 2. In some embodiments, however, insole 115 may be formed using other methods.

An example embodiment of a manufacturing process for forming an upper from a plurality of stacked substrate sheets is now described with reference to FIGS. 3-7. The process starts with a flat substrate sheet of material, and a liquid is added to the sheet in select locations. A powdered polymer (e.g., a thermoplastic or thermoset polymer) is then spread over the entire sheet. Then, suction is applied, which vacuums away any powder that is not stuck to the selectively located liquid. This process is repeated to form multiple sheets with selectively located polymer. These sheets form the layers of an additive manufacturing process. In order to join the layers, heat and pressure are used. The heat and pressure at least partially melt the polymer, which adheres adjacent substrate sheets to one another. Once the substrate sheets are attached to one another, the portions of the sheets that are not attached with melted polymer are removed, for example, using media blasting or a solvent. What is left is an upper that may be shaped around a last and attached to a sole structure to form an article of footwear. Each of these steps is discussed in further detail below.

Figure 3:
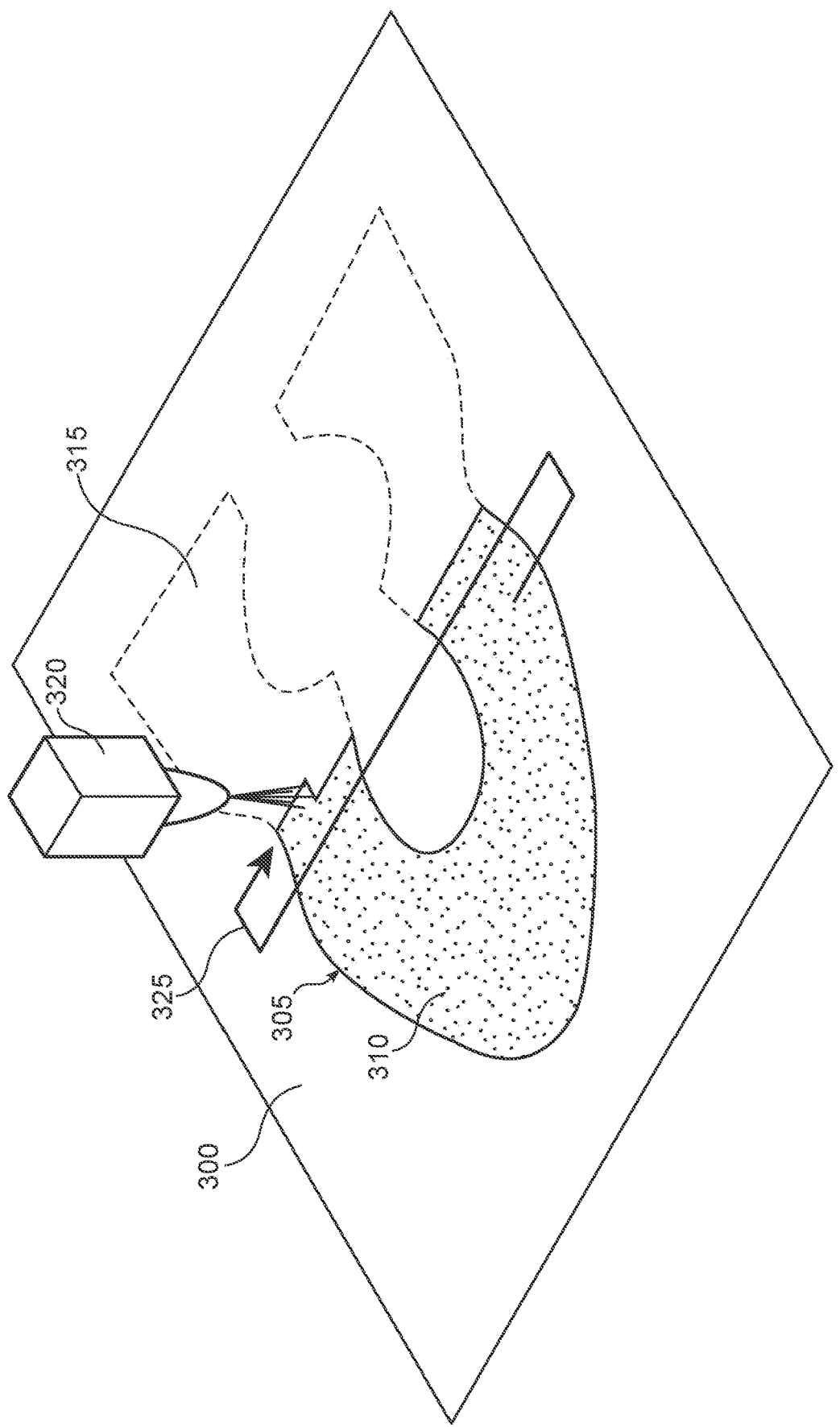
FIG. 3 is a schematic perspective view of a flat substrate sheet with liquid being sprayed on in the form of a flat upper.

FIG. 3 is a schematic perspective view of a flat substrate sheet with liquid being sprayed on in the form of a flat upper. In particular, FIG. 3 shows a substrate sheet of material 300. The substrate sheet can be any suitable textile or other material having sufficient flexibility to provide suitable properties for forming the upper. For example, the substrate can comprise any suitable fabric, such as a woven fabric, a knitted fabric, a nonwoven fabric, etc., that is formed from yarns, filaments or fibers comprising any one or more suitable materials including, without limitation, cellulosic materials (e.g., cotton, bamboo) and proteins (e.g., wool, silk, and soybean), polyolefins (e.g., polyethylene, polypropylene, etc.), polyesters (e.g., polyethylene terephthalate or PET and poly(trimethylene terephthalate)), polycaprolactam, poly(hexamethylene adipamide), acrylic, polyurethane, acetate, rayon, polyamide (nylon), aramid (e.g., Kevlar), dissolvable (e.g., water soluble polymers) such as polylactic acid (PLA), and any selected combinations and/or copolymers thereof. The substrate sheets can further be formed of an elastic material (e.g., a material with high stretch and recovery properties, such as elastane) or a non-elastic material (e.g., a material with little or no stretch properties). For example, substrate sheets can be provided that comprise an elastane material. Alternatively, the substrate sheet can be formed of a laminated or other polymer sheet that comprises any one or more of the previously noted (or other) polymer materials. Further still, and as described in further detail herein, the substrate sheet can comprise a nonwoven material that is be formed via a spray forming process in which fibers of one or more types are combined in a binder that is sprayed onto a surface to form the nonwoven substrate sheet.

Liquid may be sprayed onto substrate sheet 300 using a spraying device 320. In some embodiments, an inkjet printer (which may be modified for using different liquids) may be used to apply a liquid to select portions of substrate sheet 300. The liquid may be applied to form a liquid-sprayed upper shape 305. FIG. 3 illustrates a sprayed portion 310, illustrated with stippling, and an area 315, bounded by dashed lines and forming the remainder of the upper, but which has not yet been sprayed. An exemplary path of the spraying device 320 is illustrated by an arrow 325. Alternatively, spraying device 320 may remain stationary and substrate sheet 300 may be moved while the application of liquid takes place.

The liquid that is applied to the substrate can be water or other aqueous based solution. The liquid can also be alcohol, ketones, esters, acetates, an oil (e.g., soybean, oil, linseed oil or other vegetable oil and/or a petroleum oil) and/or any other organic solution. The liquid can also include any material that inhibits or minimizes evaporation of the liquid. For example, the liquid can comprise water with glycol and/or pyrrolidinone added to the water to inhibit evaporation of the water. The liquid can further be provided having a certain hydrophilicity or hydrophobicity that enhances placement of the liquid along the surface of the substrate sheet (e.g., attracts or repels the liquid to desired areas along the substrate sheet surface).

Figure 4:
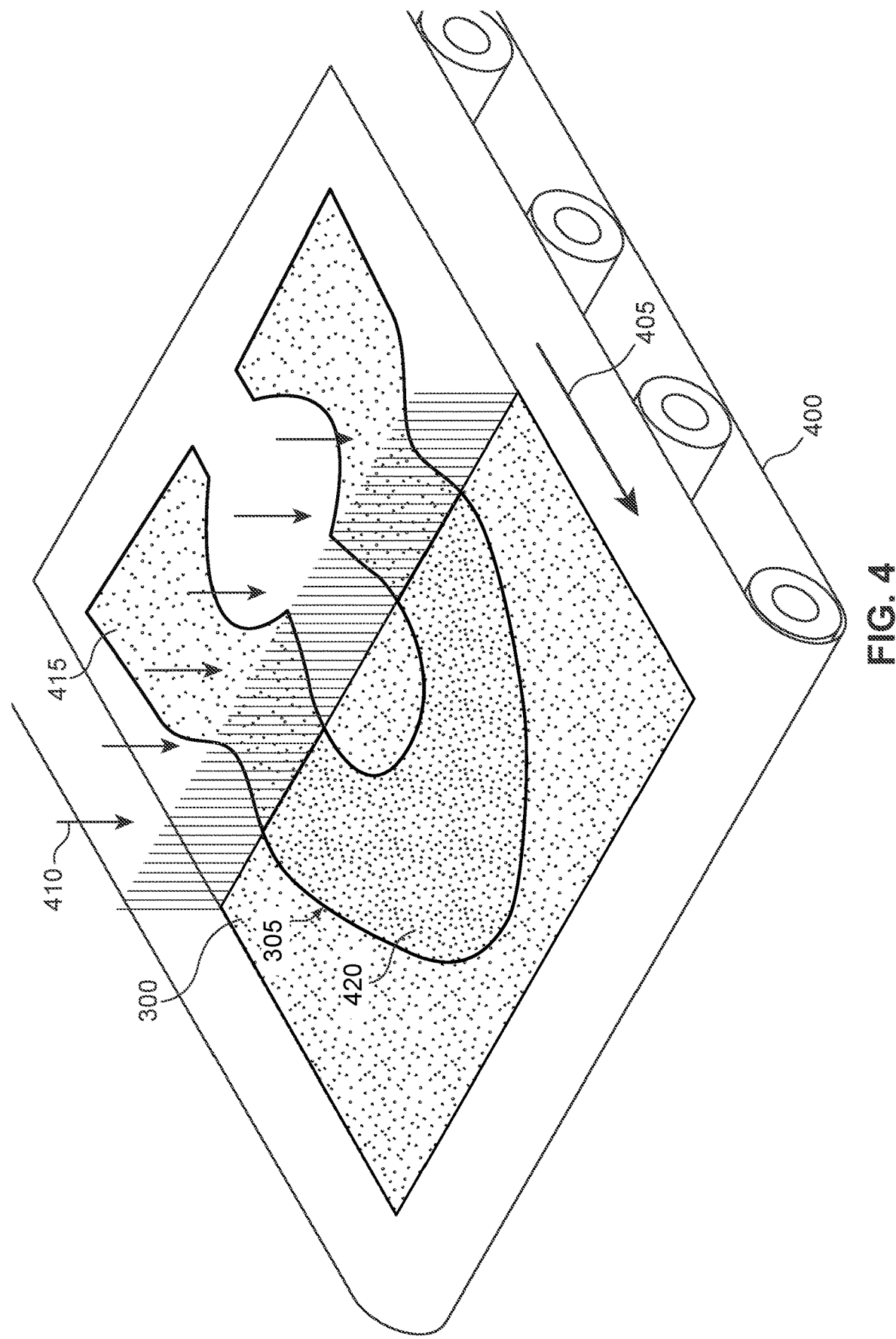
FIG. 4 is a schematic perspective view of powder being applied to the flat substrate sheet after the application of the spray-on liquid as shown in FIG. 3.

FIG. 4 is a schematic perspective view of powder being applied to the flat substrate sheet after the application of the spray-on liquid as shown in FIG. 3. As shown in FIG. 4, liquid-sprayed upper shape 305 is completely sprayed. FIG. 4 further shows the application of powder to the entire (or substantially entire) substrate sheet 300, as illustrated by a set of arrows 410.

The powder comprises particulates of one or more polymer materials. The polymer materials can comprise any suitable thermoplastic polymers or thermoset polymers which, when heated to a sufficient temperature, melt and fuse the particles together to form a solid laminate or composite layer. Some non-limiting examples of polymer particulates that can be used as the powder (which is melted to form a layer) include polyolefins (e.g., polyethylene), polyesters, epoxides, ethylene vinyl alcohol (EVA) and polyurethanes (e.g., thermoplastic polyurethane, or TPU).

Referring again to FIG. 4, the powder adheres to the liquid-sprayed upper shape 305, as illustrated by a powdered area 420 of liquid-sprayed upper shape 305. The powdered area 420, which includes both liquid and powder, is indicated by more densely populated stippling as compared to liquid-sprayed area 415, which only includes liquid.

The application of powder is performed by a stationary powder dispensing mechanism (not shown). Substrate sheet 300 is moved under the powder dispensing mechanism by a conveyor 400, as indicated by an arrow 405 showing the direction of conveyance. It will be understood that the orientation of substrate sheet 300 during this process may vary.

Figure 5:
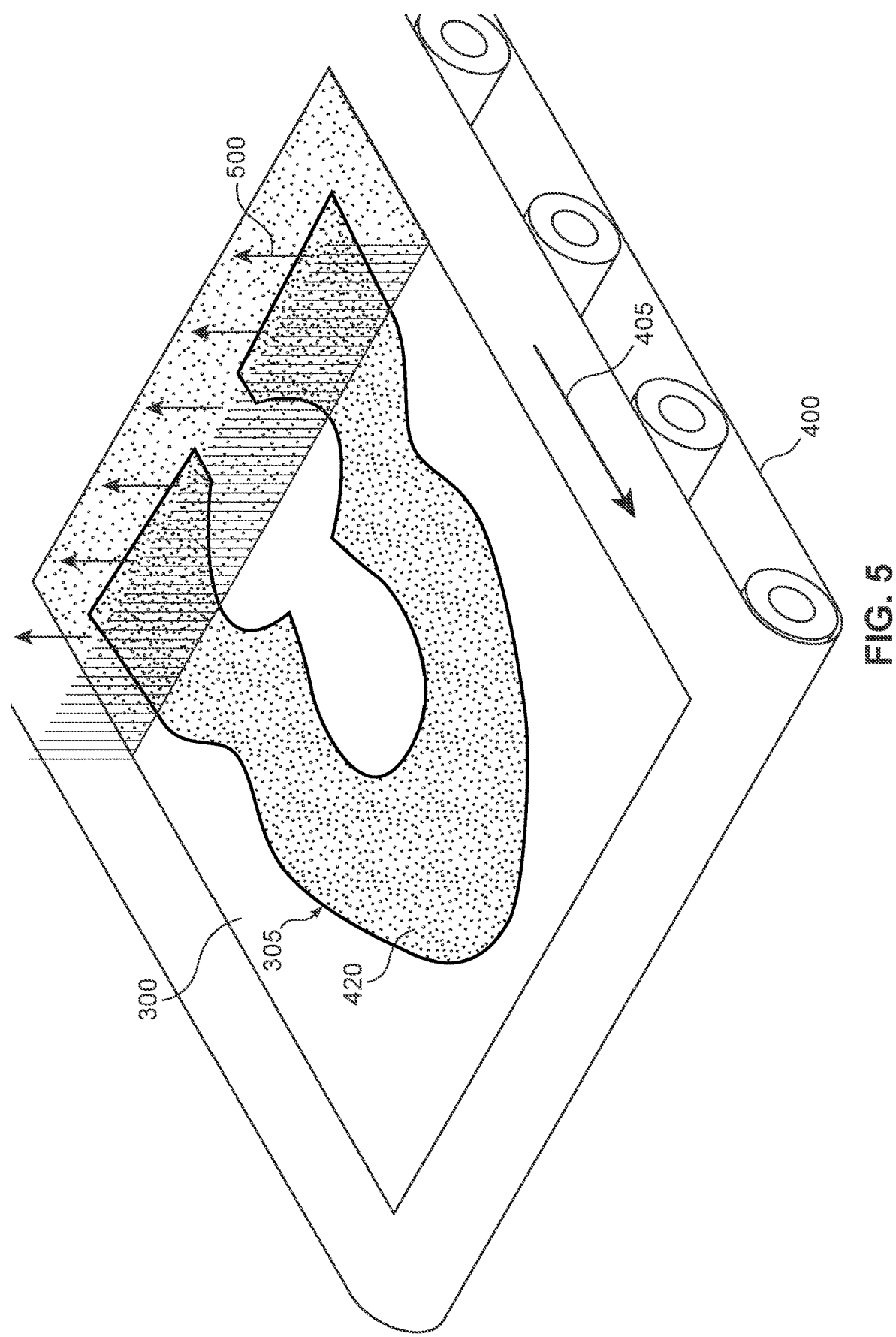
FIG. 5 is a perspective view of the powder being vacuumed off the substrate sheet from areas that were not sprayed with the liquid.

FIG. 5 is a perspective view of the powder being vacuumed off the substrate sheet from areas that were not sprayed with the liquid. A suction may be applied to substrate sheet 300, as indicated by a set of arrows 500. As illustrated by FIG. 5, all of the powder is removed from portions of substrate sheet 300 that are not coated with the liquid to form a selectively powdered sheet of material. That is, because the powder is adhered to the liquid in liquid-sprayed upper shape 305, this shape remains coated with powder after the remaining powder is vacuumed away. It will be understood that some of the powder in powdered area 420 may be removed, but a layer of powder remains adhered to the liquid in powdered area 420 after the suction is applied.

As shown in FIG. 5, the same or similar conveyor 400 used for powder application may also be used to move substrate sheet 300 while suction is applied by a stationary vacuum device (not shown). It will be understood that other methods of applying and removing powder may be used. The processes illustrated in FIGS. 4 and 5 are intended to be schematic, conveying the concepts of applying and removing powder generally. Those having ordinary skill in the art will readily recognize other suitable processes for applying and removing powder.

The processes shown in FIGS. 3-5 may be repeated multiple times to form a plurality of selectively powdered sheets. That is, the method may include applying additional liquid, additional powder, and additional suction to additional substrate sheets of material to form a stack of selectively powdered sheets of material. The shape of the selectively powdered area will vary slightly from sheet to sheet, as would layers in a 3D printed object. In the present process, however, instead of printing each layer onto the previous layer, each layer is formed separately, and then joined in a subsequent process. Thus, this stack of sheets may be joined to one another using heat and pressure.

Figure 6:
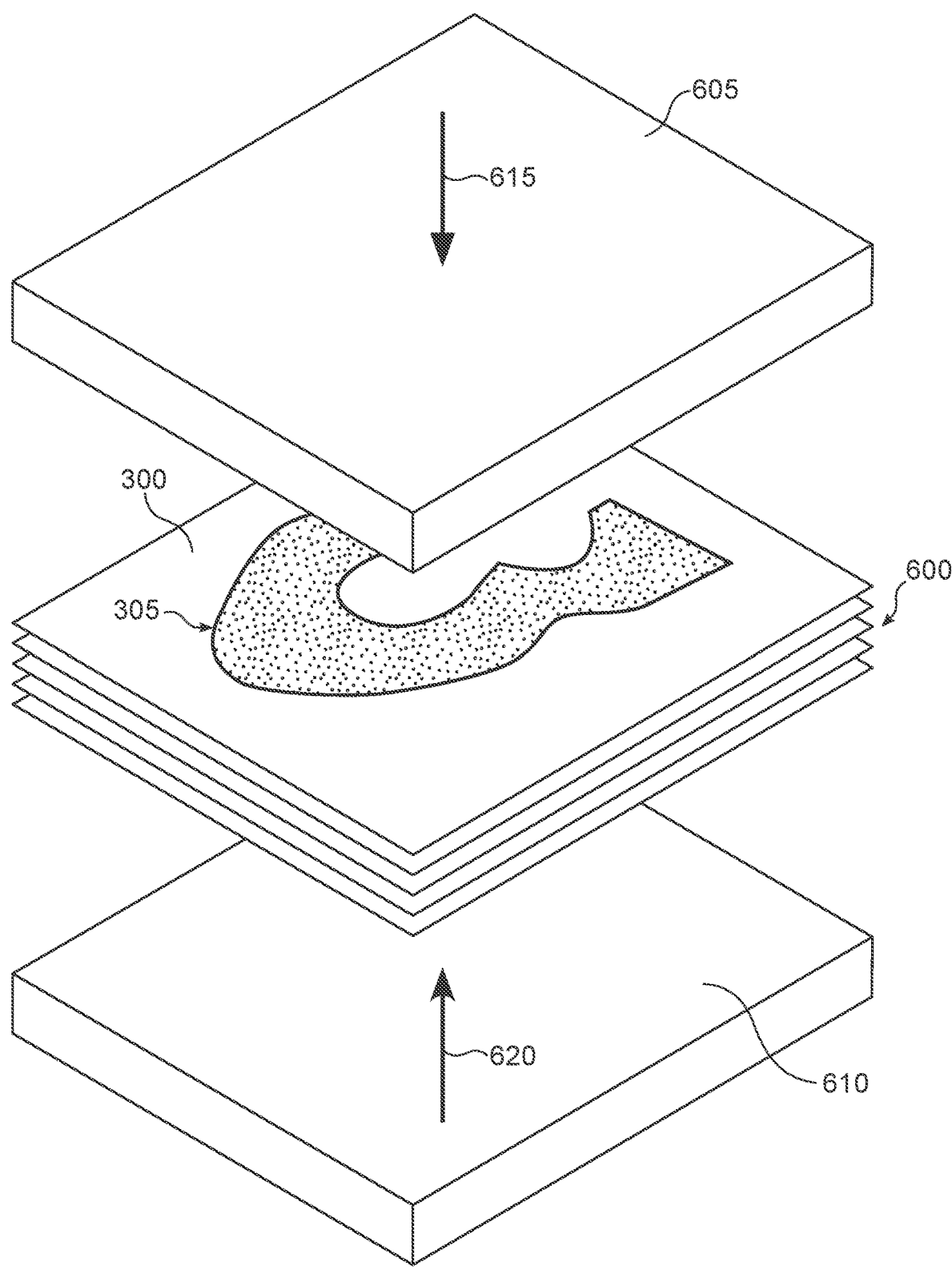
FIG. 6 is a schematic perspective view of a process of forming an upper by applying heat and pressure to multiple powdered sheets.

FIG. 6 is a schematic perspective view of a process of forming an upper by applying heat and pressure to multiple powdered sheets. As shown in FIG. 6, a stack 600 of powdered sheets may be compressed between a first plate 605 and a second plate 610, as indicated by a first arrow 615 and a second arrow 620. In addition, heat may be applied to the stack during compression. The heat melts the polymer powder on each sheet and selectively joins adjacent sheets to one another, thereby forming a partially cured structure. That is, only the powdered sections are "cured," meaning that the non-powdered sections of the sheets are uncured, i.e., not attached to one another. It will be understood that FIG. 6 is presented to illustrate the process of applying heat and pressure schematically. Those of ordinary skill in the art will readily recognize suitable shapes and configurations for first plate 605 and second plate 610, as well as suitable mechanisms for applying heat to the stack of powdered sheets.

Once the powdered sheets are joined with heat and pressure, the excess material (the uncured substrate sheet material) may be removed. In some cases, this may be done using media blasting. In some cases, this may be done using a solvent, which dissolves the uncured substrate material, but not the cured powder material. In still other cases, this may be done by melting. That is, the substrate material may melt at a lower temperature than the cured portions of the stack.

Figure 7:
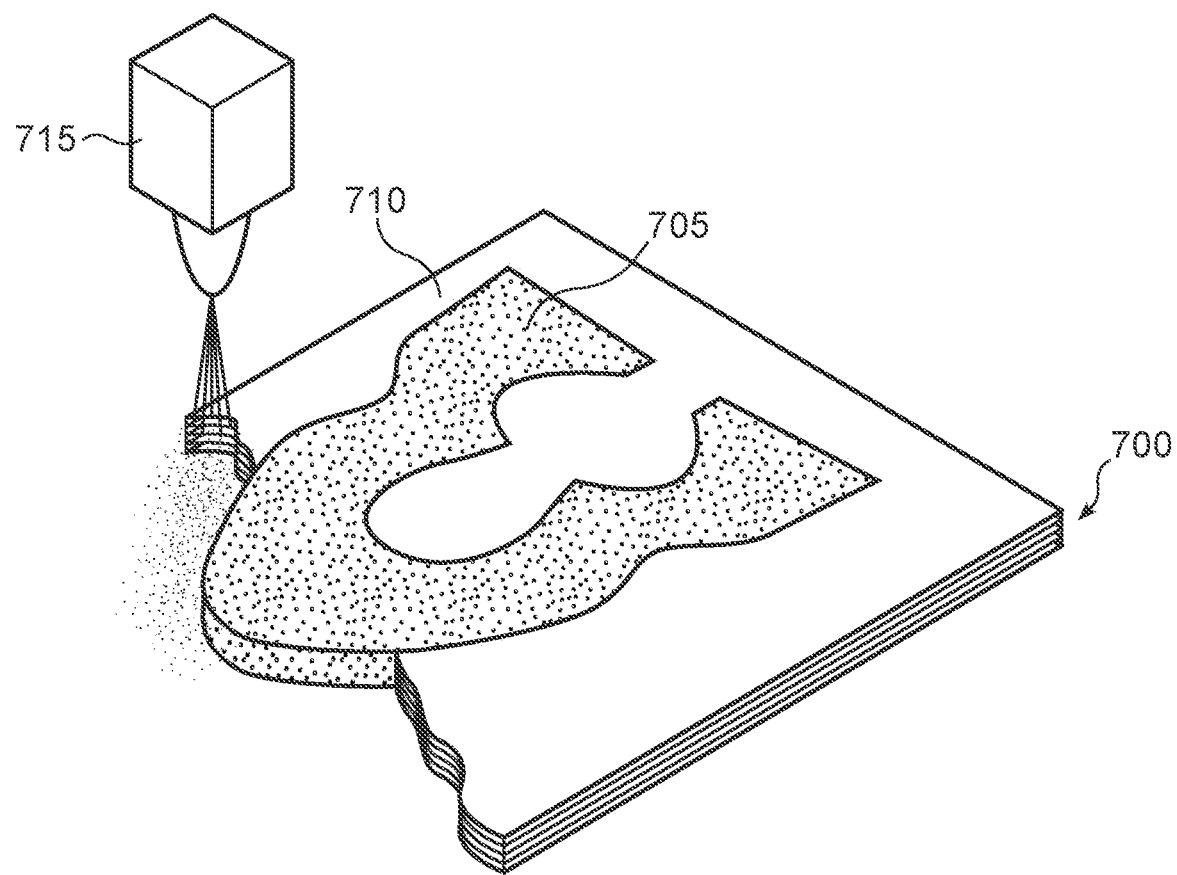
FIG. 7 is a schematic perspective view of a cured block of substrate sheets being media blasted to remove uncured portions.

FIG. 7 is a schematic perspective view of a cured block of substrate sheets being media blasted to remove uncured portions. For example, the stack 700 of substrate sheets may be joined to form a cured structure 705. The uncured portion 710 of stack 700 may be removed, for example, using media blasting, as shown in FIG. 7, leaving only cured structure 705. A media blasting device 715 is schematically illustrated in FIG. 7. It will be understood that the media blasting device may have any suitable configuration. Cured structure 705, once freed from stack 700, is a substantially flat flexible sheet configured to be formed into an upper of an article of footwear. That is, the flat flexible sheet may be shaped on a last to form an upper.

Using this technique of forming an upper enables the upper to be formed with intricate shapes and surface geometries. For example, the upper may be formed with perforations, surface textures, ribs, bumps, ridges, etc.

In addition, different portions of the substantially flat flexible sheet may be formed to have different properties. For example, in some embodiments, different materials may be used to form different portions of the upper. For example, in some cases, a heel counter or toe cap may be formed to be more rigid than other portions of the upper. In some embodiments, portions having a different property may include surface texture elements that are that are more compressible than other portions of the upper. Locations along lateral and/or medial side portions and/or other portions (e.g., front and/or heel portions) of the upper can also be imparted with different properties, such as varying elastic properties, varying rigid properties, varying porosity properties through the upper, etc.

Additionally, or alternatively, the different properties may be produced by using different materials for different substrate sheets of material. Additionally, or alternatively, the different properties may be produced for different areas of the footwear by differing the amount of powder applied. In some cases, more powder may be applied by slowing down the speed at which the substrate sheet is conveyed beneath the powder dispensing device.

Figure 8:
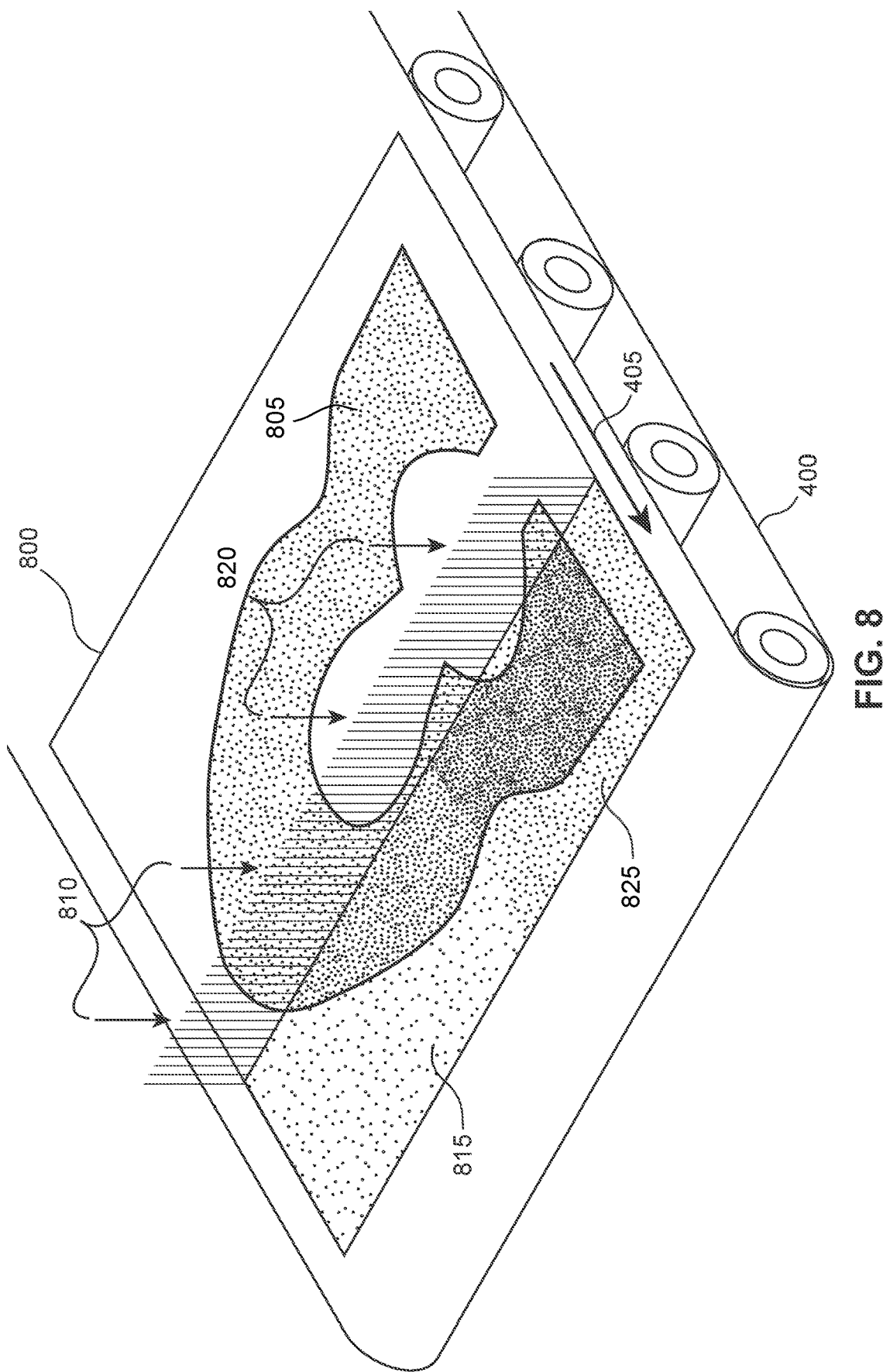
FIG. 8 is a schematic perspective view of one powder being applied to form one portion of an upper and a different powder being applied to form another portion of the upper.

FIG. 8 is a schematic perspective view of one powder material being applied to form one portion of an upper and a different powder material being applied to form another portion of the upper. As shown in FIG. 8, a substrate sheet 800 with a liquid-sprayed upper shape 805 sprayed onto it may have two different powders applied to it. For example, a first set of arrows 810 indicates a first type of powder applied to a first area 815 of substrate sheet 800, and a second set of arrows 820 indicates a second type of powder being applied to a second area 825 of substrate sheet 800.

Figure 9:
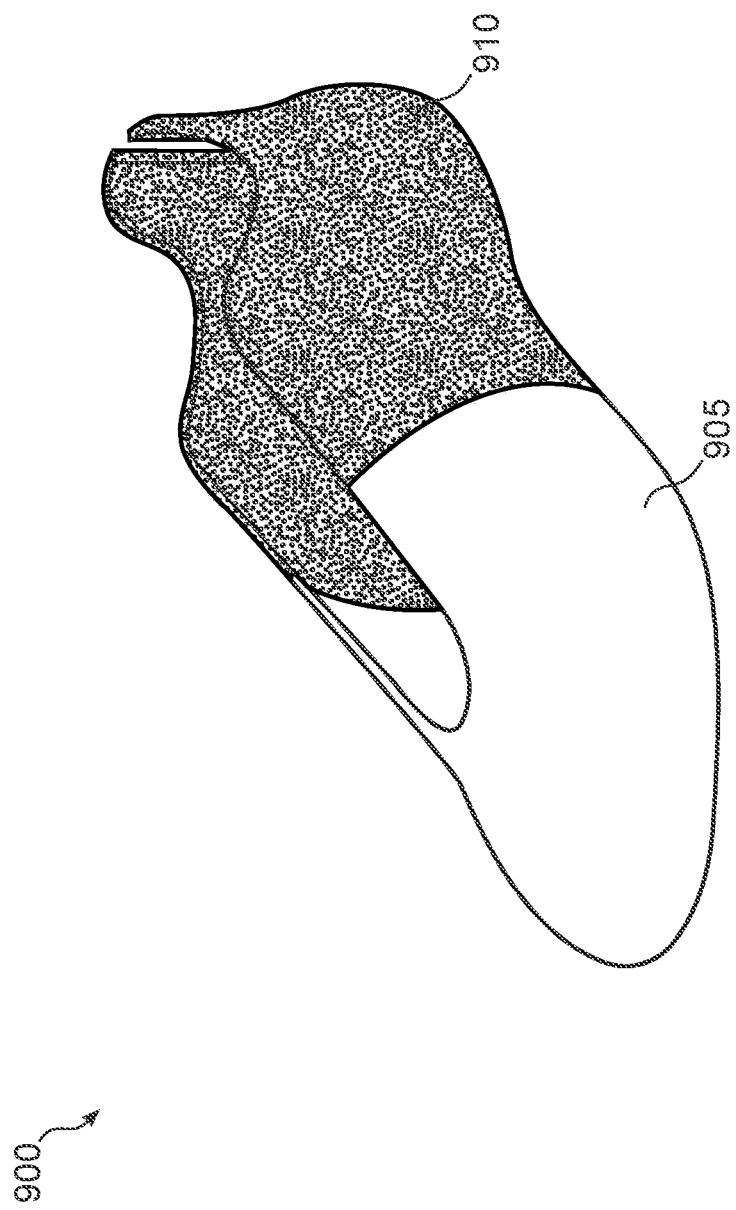
FIG. 9 is a schematic perspective view of an upper formed of two different materials.

FIG. 9 is a schematic perspective view of an upper formed of two different materials. That is, after applying different powders as shown in FIG. 8, then applying suction and joining a stack of such powdered sheets, the resulting upper may appear as shown in FIG. 9. As shown in FIG. 9, an upper 900 may have a front portion 905 formed of a first material and a rear portion 910 formed of a second material. For example, in some embodiments, front portion 905 may be formed of a relatively flexible and/or elastic material, whereas rear portion 910 may be formed of a relatively stiff and/or inelastic material.

As previously noted, a number of different types of polymers may be used to form the powders which facilitate fusing together of substrate sheets to form the upper. In addition, a number of different types of polymers and/or other materials can also be used to form the substrate sheets, where the substrate sheets can be fibrous layers, such as woven, knitted or nonwoven layers and/or a continuous, laminate layer of one or more polymers. In some embodiments, thermoplastics may be used for either or both the sheet materials and the powders. In some embodiments, materials such as polyethylene, polyester, EVA, TPU, and/or other polymeric materials suitable for footwear uppers may be utilized.

Figure 10:
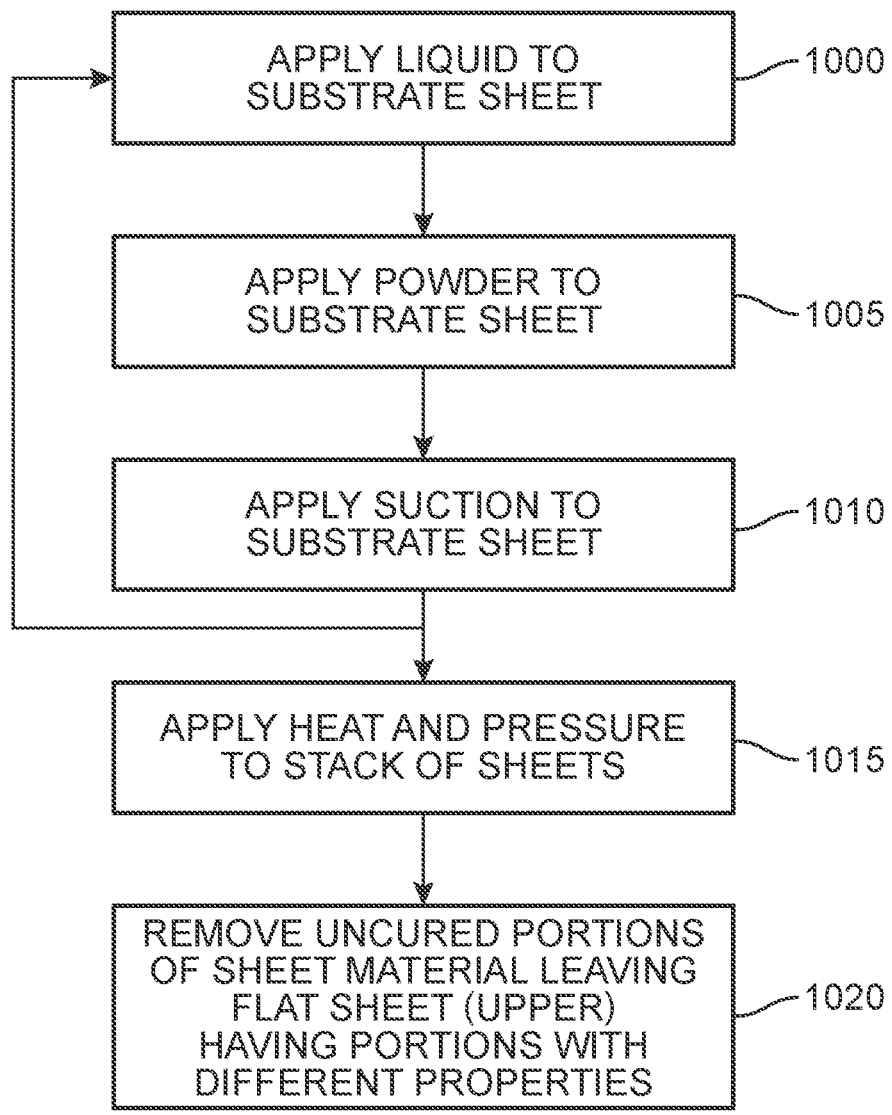
FIG. 10 is a flowchart indicating a method of making an upper for an article of footwear.

FIG. 10 is a flowchart indicating a method of making an upper for an article of footwear. As shown in FIG. 10, in a first step 1000, liquid is applied to a substrate sheet. In a second step 1005, powder is applied to the substrate sheet. In step 1010, suction is applied to the substrate sheet to remove excess powder from unsprayed portions of the sheet. This process may be repeated to form multiple powdered substrate sheets. In step 1015, heat and pressure are applied to a stack of powdered substrate sheets. Finally, in step 1020, uncured portions of sheet material are removed, leaving a flat sheet (upper) having portions with different properties. As discussed above, the different properties may be provided by using different materials for the substrate sheets and/or using different powders for different areas of the upper. Additionally, different properties may be provided by applying different amounts of powder to different portions of the upper.

In addition to uppers, the process described above in FIGS. 3-10 may also be utilized to form other components of an article of footwear. For example, a soleplate, such as for a cleated shoe may be formed using this process. Further, such a process may facilitate forming the soleplate out of multiple materials.

Figure 11A:
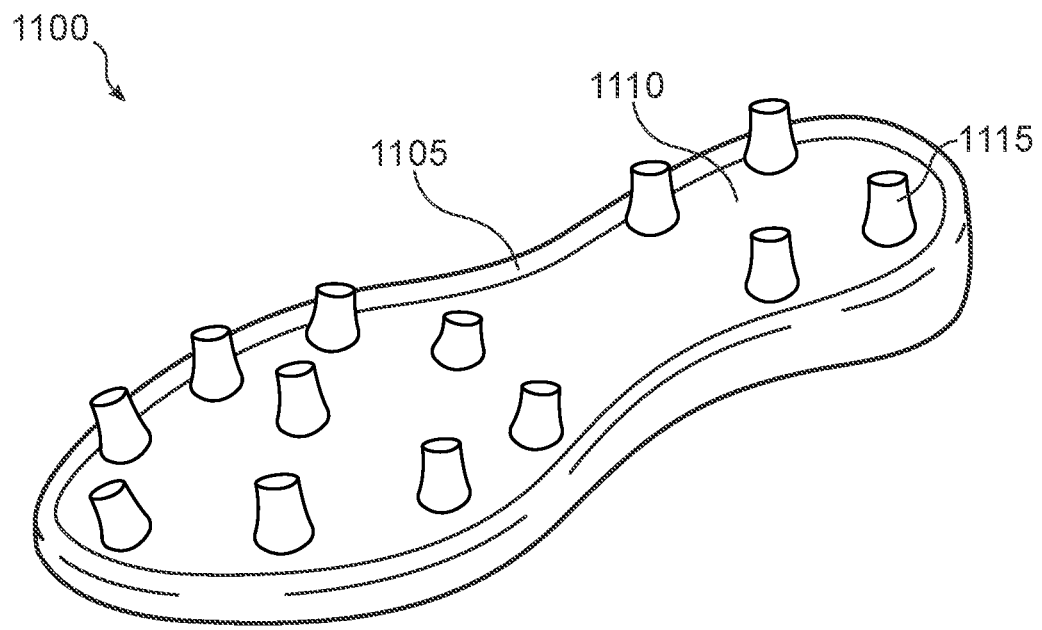
FIG. 11A is a schematic perspective bottom view of a sole plate formed with different materials.

FIG. 11A is a schematic perspective bottom view of a sole plate formed with different materials. FIG. 11A shows a soleplate 1100 formed of at least two different materials. For example, a first portion 1105 of soleplate 1100 may be formed of a first material, such as EVA and/or TPU, whereas a second portion 1110 of soleplate 1100 may be formed of carbon fiber and/or nylon. By forming second portion 1110 from a more rigid material, cleats 1115 may be better supported, while other portions of soleplate 1100 may be more flexible. In some embodiments, a third portion of soleplate 1100 may be formed of a third material. Further, by using this process, additional details, texture components, and/or traction elements may be formed in soleplate 1100.

As with the uppers discussed above, the soleplates may be formed having different properties in different portions of the soleplate. As discussed above, in some embodiments, different properties may be produced by using different materials in different areas of the soleplate. In some embodiments, the different properties may be produced by using two or more different powders. In some embodiments, the different properties may be produced by using different amounts of powder in different areas. In some embodiments, the different properties are produced by using different materials for the additional sheets of material.

For soleplates, more rigid materials may be used than for uppers. Accordingly, substrate sheets other than polymers may be used. For example, carbon fiber substrate sheets may be used to form portions of a soleplate, or the entirety of a soleplate. The methods for removing uncured portions of such substrate sheets may be varied accordingly. For example, media blasting may be suitable for removing uncured portions of carbon fiber sheets.

Figure 11B:
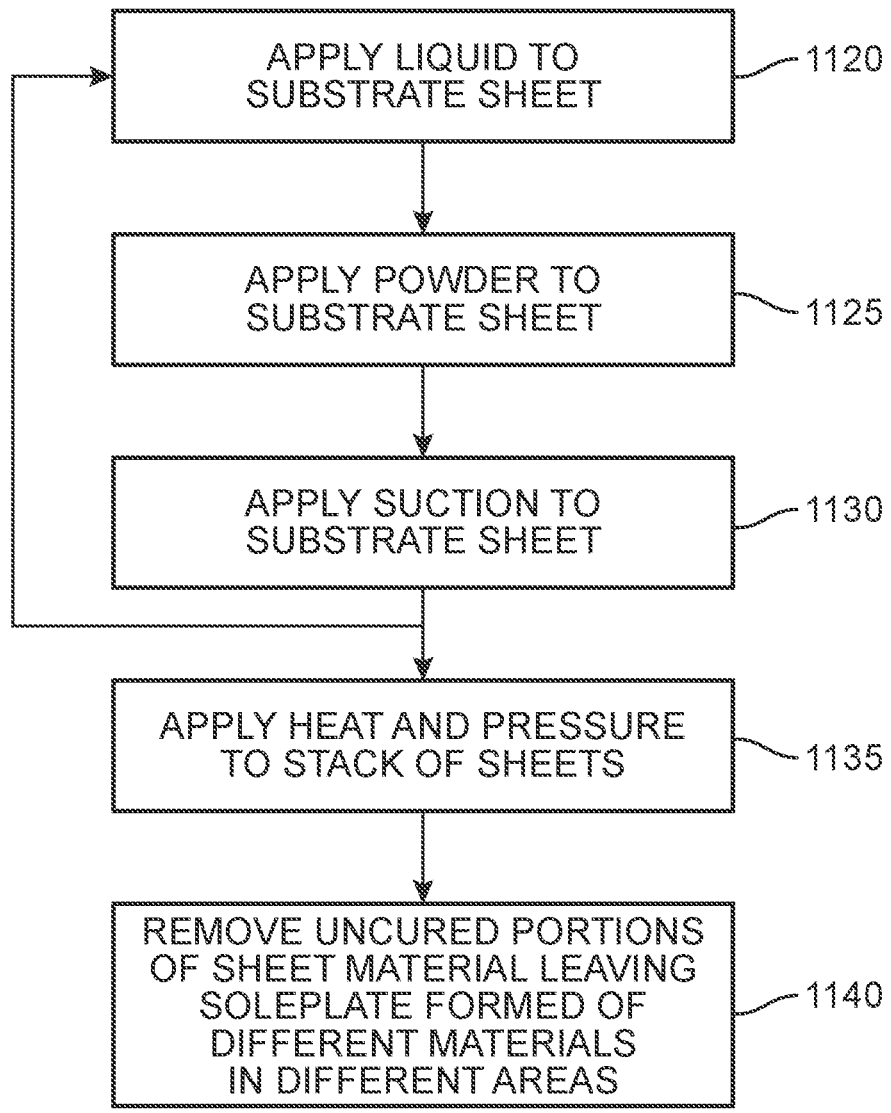
FIG. 11B is a flowchart showing a method of making a soleplate for an article of footwear.

FIG. 11B is a flowchart showing a method of making a soleplate for an article of footwear. As shown in FIG. 11B, step 1120 may include applying a liquid to select portions of a first substrate sheet of material. Step 1125 may include applying powder, including one or more powder materials, to the first substrate sheet of material. Step 1130 may include applying suction to the first substrate sheet of material in order to remove the powder from portions of the first substrate sheet of material that are not coated with the liquid to form a selectively powdered sheet of material. This process may be repeated to form multiple powdered sheets by applying additional liquid, additional powder, and additional suction to additional substrate sheets of material to form a stack of selectively powdered sheets of material. Then, in step 1135, the method may include using compression and heat to join the stack of selectively powdered sheets of material into a partially cured structure. Finally, step 1140 may include removing uncured portions of sheet material from the partially cured structure leaving a sole plate formed of different materials in different areas of the sole plate.

As previously noted herein, the substrate sheet layers can comprise nonwoven layers that are formed with a spray forming process. For example, the substrate layers may be formed by spraying a solution containing a polymer dissolved in or carried by a solvent, where the solvent evaporates or is dried when the solution is sprayed, leaving a nonwoven polymer sheet. In another example, a spray forming process is utilized to form a nonwoven polymer sheet by spraying a solution comprising polymer fibers (e.g., staple fibers, such as fibers of at least about 0.01 mm in length and no greater than about 20 mm in length) in a binder onto a surface. The sprayed on binder and fiber mixture is dried, set or cured so as to form a nonwoven, fibrous polymer substrate. For example, polymer fibers comprising one or more polymers of any suitable type, such as those previously noted herein, can be provided within a binder material that facilitates spray forming of the nonwoven layer. The binder material can comprise, e.g., a suitable organic solvent (e.g., a C2-C12 alkane, ether, alcohol, ketone or ester) combined with a suitable block copolymer (e.g., a polystyrene-polybutadiene-polystyrene block copolymer) such that, when combined with the staple fibers, the binder material provides a suitable viscosity for the fibrous material composition to be sprayed onto the surface so as to form the nonwoven, fibrous material substrate sheet.

Following the formation of the nonwoven polymer sheet, a similar process as that discussed above may be used. For example, on top of the nonwoven polymer sheet, a liquid may be sprayed in an area having the shape of a footwear upper. Then, a polymer powder may be applied to the sheet and then vacuumed off, leaving polymer powder only in the area to which the liquid was applied. Multiple sheets formed in this manner may be stacked and melded together with heat and compression. Then areas surrounding the footwear upper may be removed by one of several processes. For example, in some embodiments, the excess material may be removed with media blasting or a laser. In other embodiments, the excess material may be dissolved away with a solvent.

Figure 12A:
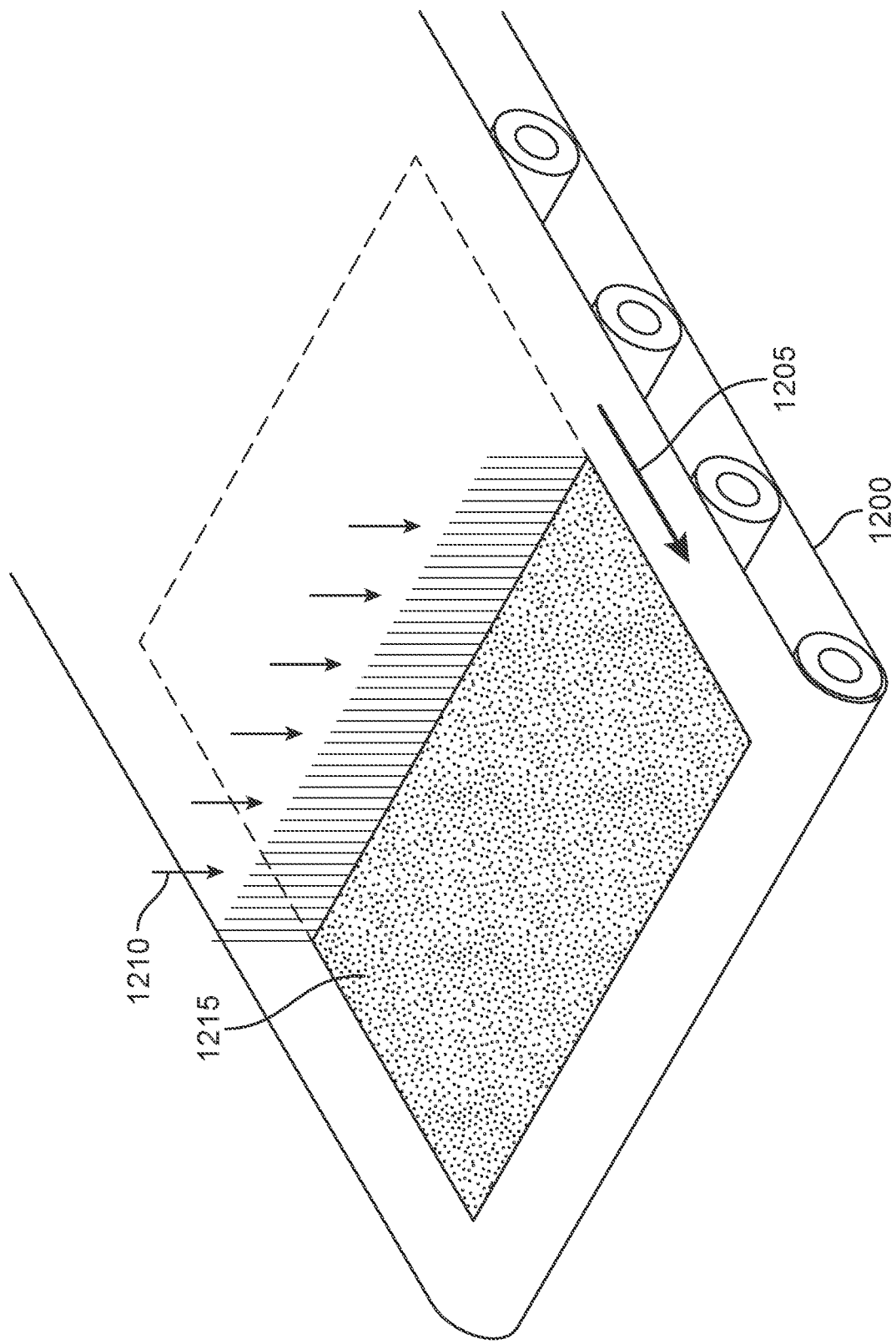
FIG. 12A is a schematic perspective view of a process of a dissolved polymer being sprayed onto a platform to form a nonwoven polymer sheet.

FIGS. 12A-D illustrate the steps of forming an upper using a sprayed-on nonwoven polymer base. FIG. 12A is a schematic perspective view of a process of a spray forming a liquid onto a platform to form a nonwoven polymer sheet. As shown in FIG. 12A, a conveyor 1200 may move in a direction 1205 as a liquid is applied to the platform or conveyor belt. The application of liquid is illustrated by a series of arrows 1210. As the liquid is sprayed, the binder and fibers are dried, set or cured to form a nonwoven polymer sheet 1215. It will be understood that, while FIG. 12A shows spray from a stationary sprayer onto a moving conveyor, in some embodiments, the platform may be stationary and the sprayer may be moved. In some embodiments, both the platform and the sprayer may be moved during the process.

Figure 12B:
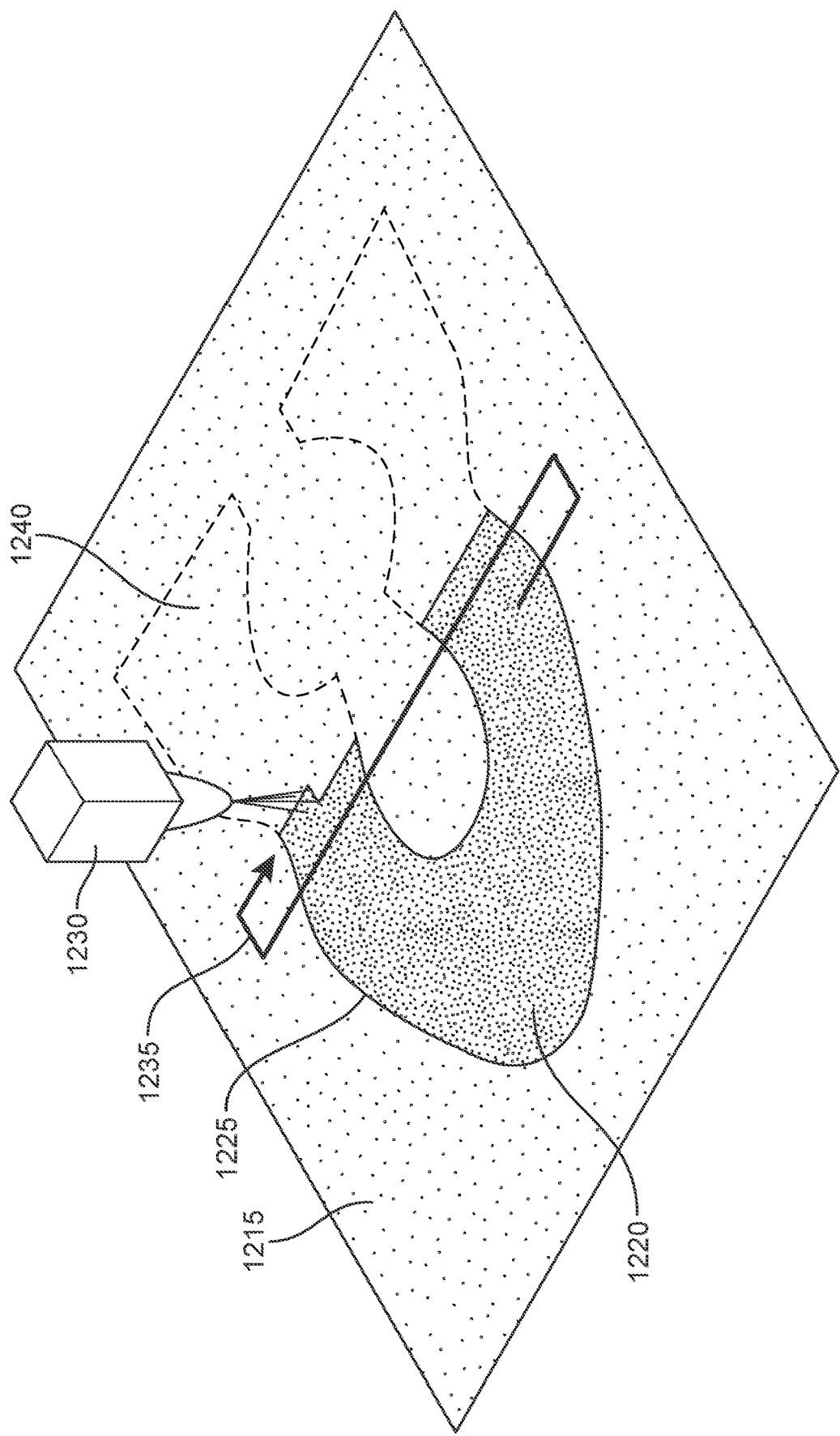
FIG. 12B is a schematic perspective view of the nonwoven polymer sheet formed in the process shown in FIG. 12A with liquid being sprayed on in the form of a flat footwear upper.

FIG. 12B is a schematic perspective view of the nonwoven polymer sheet formed in the process shown in FIG. 12A with liquid being sprayed on in the form of a flat footwear upper. As shown in FIG. 12B, liquid is sprayed onto nonwoven polymer sheet 1215 in a select region in the shape of a footwear upper, identified by a boundary line 1225. FIG. 12B also shows an area 1220 to which the liquid has been applied by a spraying device 1230. For example, in some embodiments, spraying device 1230 may be moved along a path illustrated by an arrow 1235. The remainder of the upper region is illustrated by an as yet unsprayed region 1240.

Figure 12C:
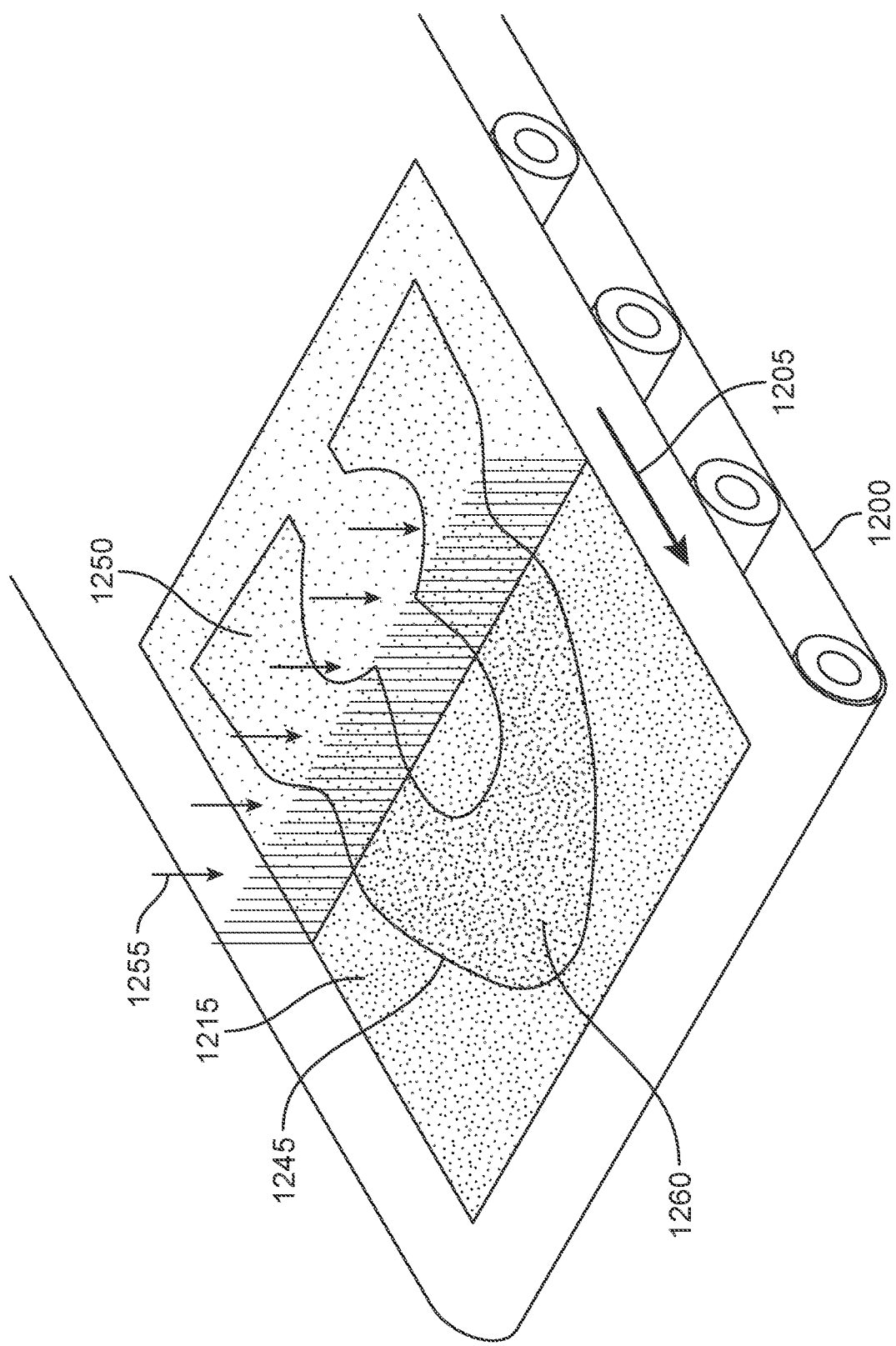
FIG. 12C is a schematic perspective view of powder being applied to the nonwoven sheet with the liquid sprayed upper.

FIG. 12C is a schematic perspective view of powder being applied to the nonwoven sheet with the liquid sprayed upper. As shown in FIG. 12C, an outline 1245 illustrates the liquid sprayed upper area. The application of powder is illustrated by a plurality of arrows 1255. Area 1250 shows an unpowdered region of the upper, whereas area 1260 shows a powdered region of the upper. This application of powder may be performed using a conveyor as shown, or some other device that moves the nonwoven sheet. Alternatively, the sheet may be held stationary and the powder application device may be moved. As yet another alternative, both the nonwoven sheet and the powder application device may be moved.

Figure 12D:
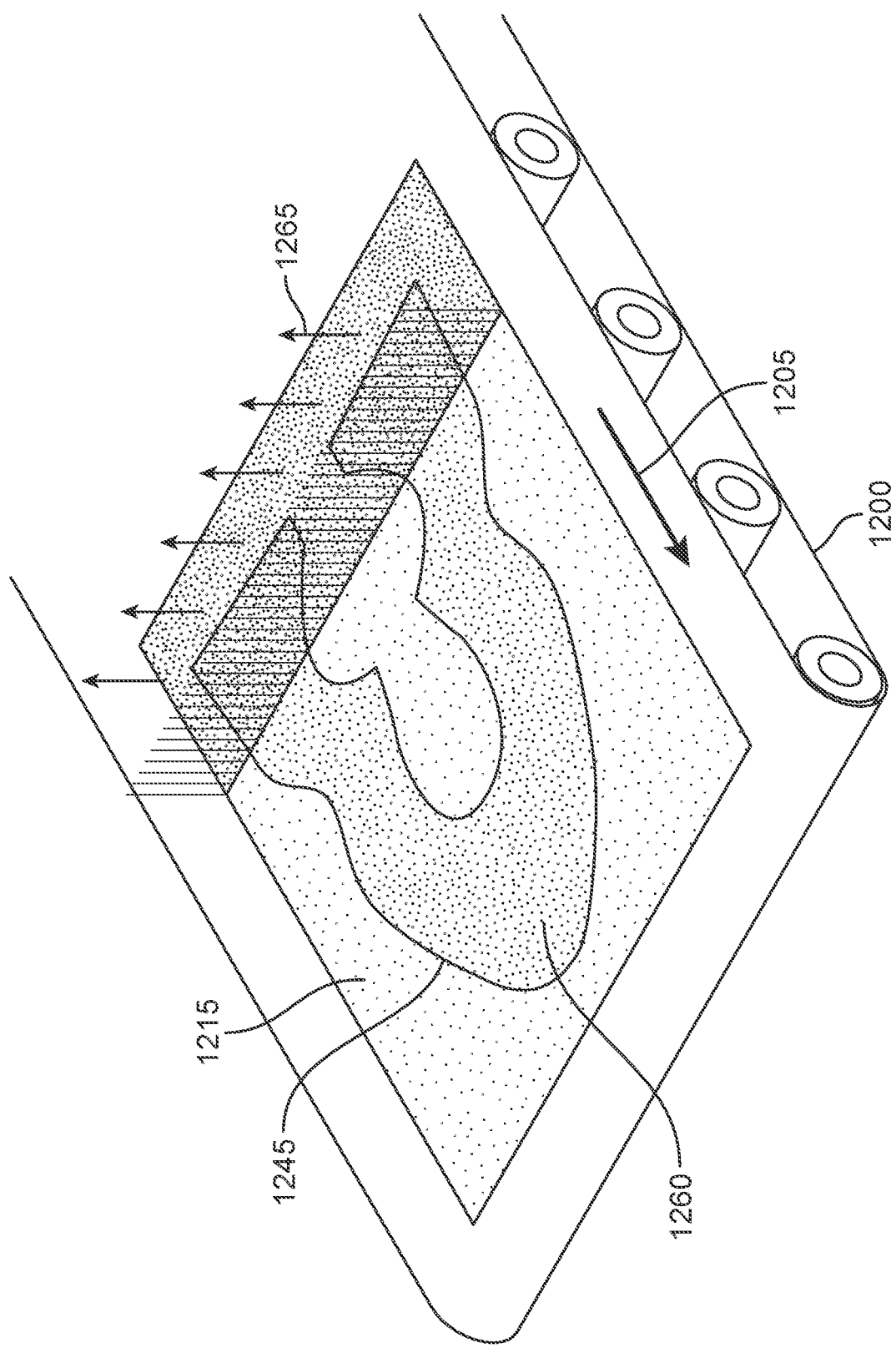
FIG. 12D is a schematic perspective view of powder being vacuumed off of areas of the nonwoven sheet that were not sprayed with the liquid.

FIG. 12D is a schematic perspective view of powder being vacuumed off of areas of the nonwoven sheet that were not sprayed with the liquid. The removal of powder from the nonwoven sheet is illustrated by a plurality of arrows 1265. The powder is vacuumed off of the areas that have not been sprayed with the liquid.

Figure 13:
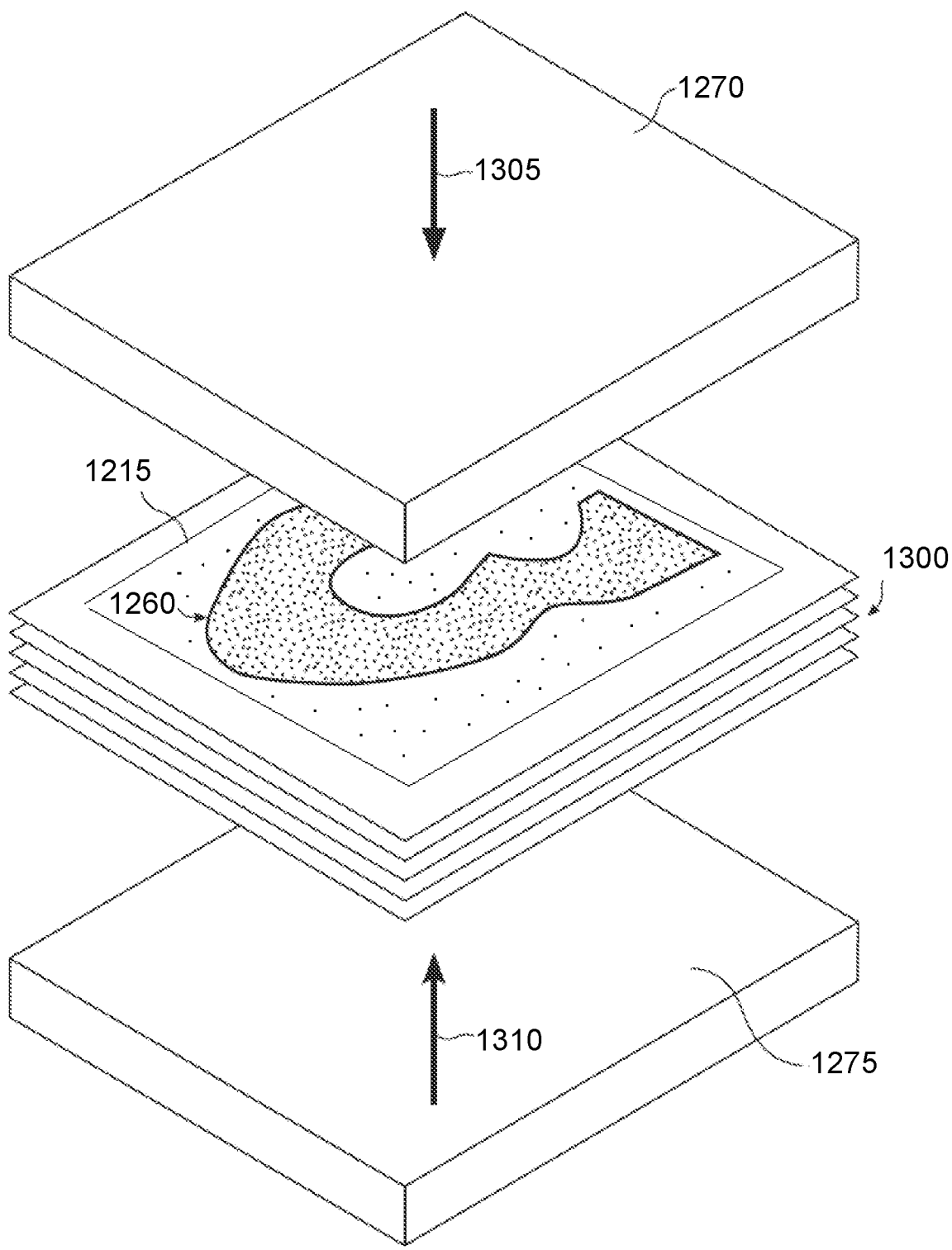
FIG. 13 is a schematic view multiple layers of upper being joined with heat and pressure.

FIG. 13 is a schematic view multiple layers formed by the process above being joined with heat and pressure. As shown in FIG. 13, a stack 1300 of polymer sheets may be joined using compression indicated by a first arrow 1305 and a second arrow 1310. In addition, the stack may be heated during compression to at least partially melt the polymer layers and join them to one another. This results in a cured structure in the form of a substantially flat flexible sheet configured to be formed into an upper of an article of footwear.

In some embodiments, different portions of the substantially flat flexible sheet may have different properties. For example, different spray-on polymers may be sprayed to form different portions of the upper. This may be accomplished by spraying different dissolved polymers in different regions when forming the nonwoven polymer sheet. Alternatively or additionally, different dissolved polymers may be sprayed in targeted regions of the upper. This may be done as part of the nonwoven polymer sheet or on top of a previously formed nonwoven polymer sheet formed with a different dissolved polymer.

Figure 14:
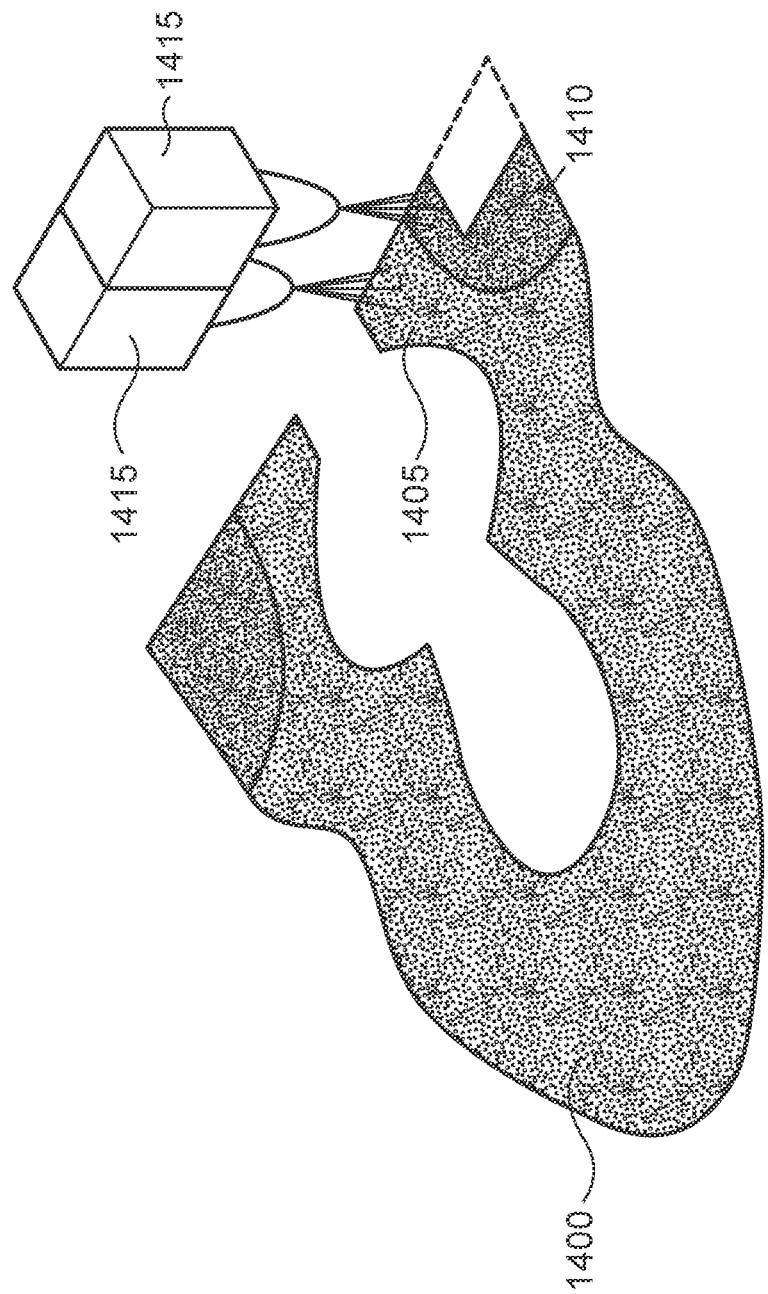
FIG. 14 is a schematic view of different spray-on polymers being sprayed onto different portions of an article of footwear.

FIG. 14 is a schematic view of different spray-on polymers being sprayed onto different portions of an article of footwear. As shown in FIG. 14, a polymer layer 1400 may be formed with a first area 1405 sprayed of a first material, and a second area 1410 sprayed of a different material. For example, as shown in FIG. 14, second area 1410 represents a heel counter portion of the upper. The heel counter may be formed of a relatively stiffer material as compared to the first area 1405 of polymer layer 1400.

Different nozzles may be used to spray different materials. For example, as shown in FIG. 14, a first nozzle 1415 may be used to spray the first material to form first area 1405 of polymer layer 1400, and a second nozzle 1420 may be used to form second area 1410 of polymer layer 1400.

In some embodiments, different portions of the uppers may be formed with different properties by using different quantities of sprayed-on polymer. In some cases, different amounts of polymer may be applied by varying a conveying speed of a conveyor carrying a substrate upon which the polymer layers are formed.

Figure 15:
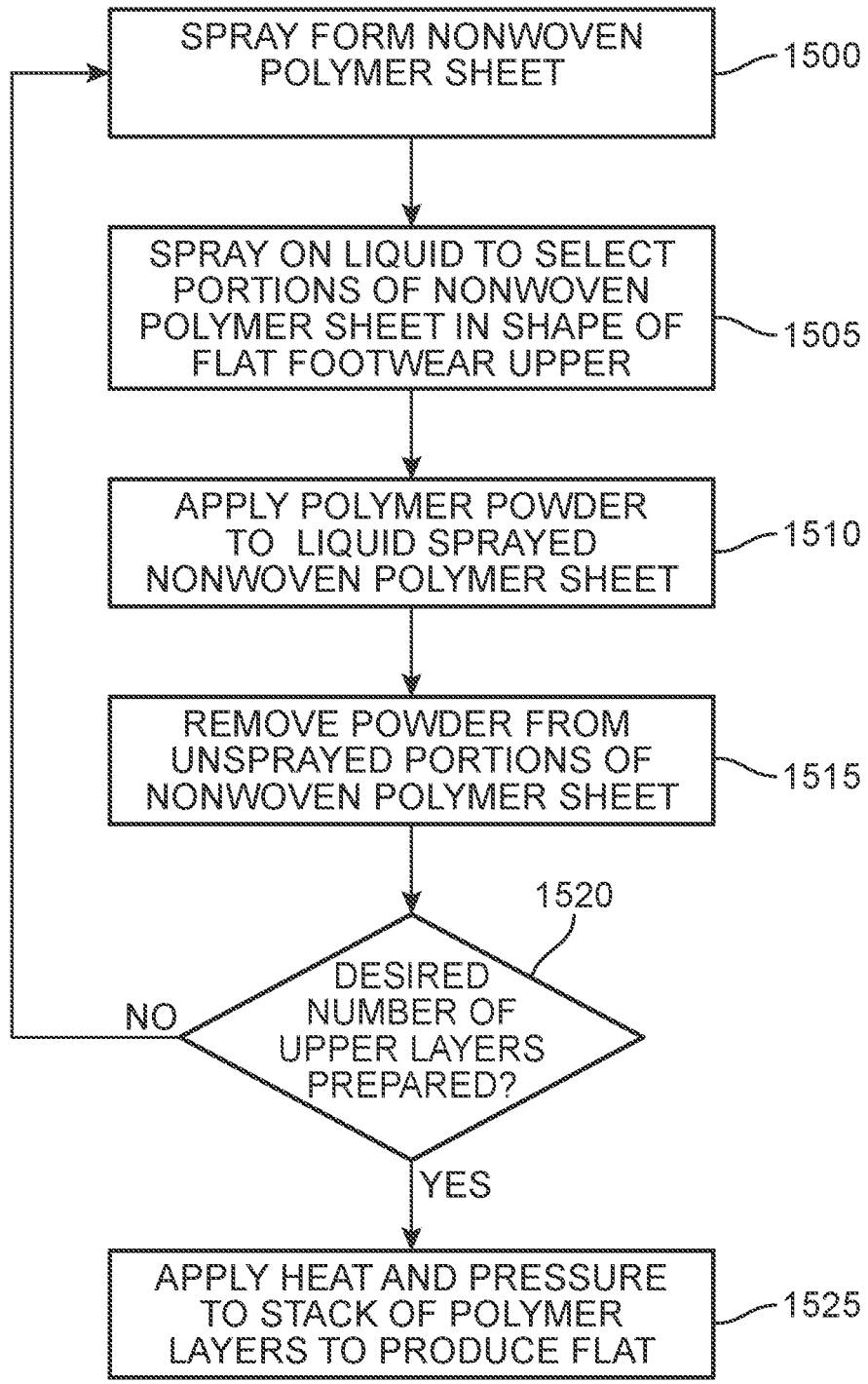
FIG. 15 is a flowchart showing another method of making an upper for an article of footwear.

FIG. 15 is a flowchart showing a method of making an upper for an article of footwear using the technique discussed above. In particular, in step 1500, a spray-on polymer layer may be formed, that is, by spraying forming a nonwoven polymer sheet. At step 1505, a liquid may be sprayed to select portions of the nonwoven polymer sheet in the shape of a flat footwear upper. At step 1510, a polymer powder may be applied to the nonwoven polymer sheet. The powder sticks to the liquid sprayed onto select portions of the sheet. Then, in step 1515, the powder may be removed (e.g., with a vacuum) from the portions of the sheet that were not sprayed with the liquid. At step 1520, the process involves making a determination as to whether the desired amount of layers have been prepared to form the upper. If not, the process returns to the start to begin forming another layer. If so, the process proceeds to step 1525, in which heat and pressure may be applied to a stack of the polymer layers to produce an upper. Following these steps, the excess material may be removed from around the upper, as shown and discussed with respect to FIG. 7. Once the excess material has been removed, the flat upper may be formed into a three-dimensional upper, for example by mounting it on a last and stitching or bonding the left and right heel portions to one another.

A benefit of forming a nonwoven polymer sheet via a spray forming process is that an additional, manipulatable component is added to the assembly. For example, not only may the polymer powder be selected, but also the polymer fibers used to form the nonwoven substrate. In addition, the amounts of each of these polymers may be varied. Also, the amount of polymer layers used to form the upper may be varied. Thus, the properties of the upper may be manipulated significantly.

The embodiments described for forming an upper as depicted in FIGS. 3-10 and 12-15 relate to forming an upper with a series of layers, where the layers form a thickness of the upper and result in a general planar configuration for the upper shape. In other words and, e.g., as depicted in FIG. 7, the structure that is formed is a flat upper (e.g., a blank or template for the upper) that is then used to form a three-dimensional upper (e.g., by placing the flat upper on a last with further processing to form the upper). However, utilizing the additive manufacturing techniques as described herein, uppers can be formed three-dimensionally with the combining of the stacked layers. In addition, a plurality of uppers can be formed simultaneously with the stacking of layers.

For example, the additive manufacturing techniques discussed in detail above, the formation of multiple nested uppers can be achieved in a manner as described with reference to FIGS. 16-20.

Figure 16:
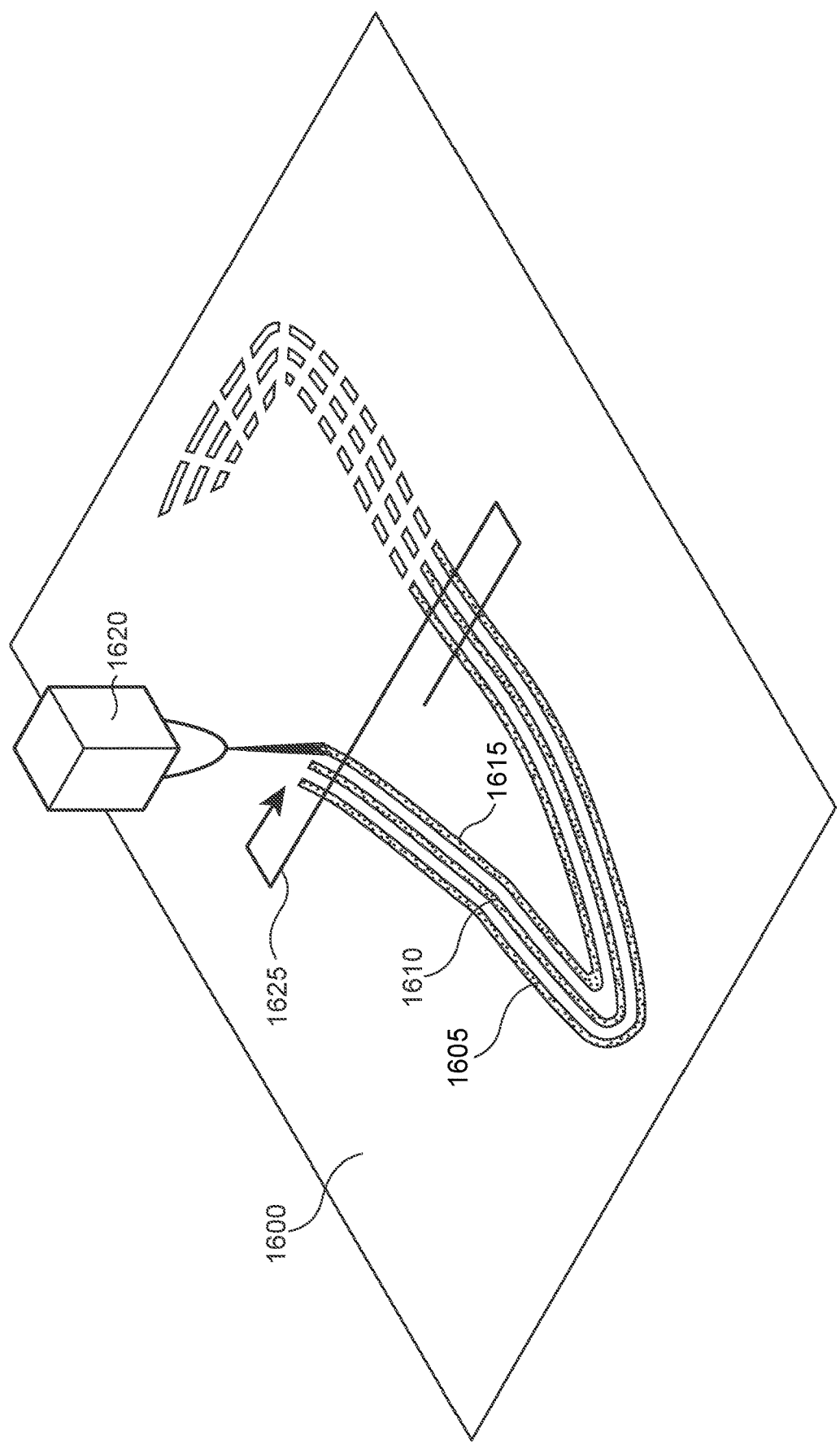
FIG. 16 is a schematic perspective view of multiple uppers being formed in a nested configuration.

FIG. 16 is a schematic perspective view of multiple uppers being formed in a nested configuration. Similar to the process discussed above for flat-formed uppers (i.e., blanks or templates that are used to shape and form upper), as shown in FIG. 16, the nested uppers may be formed by spraying liquid in a pattern. For example, as shown in FIG. 16, a substrate sheet 1600 may have a liquid sprayed onto it (e.g., using an inkjet printer as described above) to form a first upper portion 1605, a second upper portion 1610, and a third upper portion 1615. A liquid spraying device 1620 is illustrated schematically, as is its path, which is shown by an arrow 1625. It will be noted that, for purposes of illustration, the layer shown in FIG. 16 is from a middle portion of the uppers. That is, the layer shown in FIG. 16 is not the first layer to be formed.

As with the flat-formed uppers described above, subsequent to this liquid application process shown in FIG. 16, powder may be applied to substrate sheet 1600. Then, the powder may be removed from the non-sprayed portions of substrate sheet 1600 to form powdered areas. The powdered sheets may be arranged in a stack and joined using heat and pressure as described above. The uncured portions of the joined stacks may then be removed using techniques such as media blasting, solvents, and/or melting.

In some embodiments, different powders may be applied to the substrate sheets of material, wherein one powder forms the uppers and one powder forms a spacer material between the uppers. Those of ordinary skill in the art will readily recognize methods for selectively applying different powders to different areas of a substrate sheet.

In some embodiments, substrate waste may be minimized by arranging uppers on the substrate sheets in the manner shoes are arranged in a shoebox. That is, by forming the uppers on their sides with the sole portions facing away from one another in opposite directions, a larger portion of the substrate sheets may be utilized.

Figure 17:
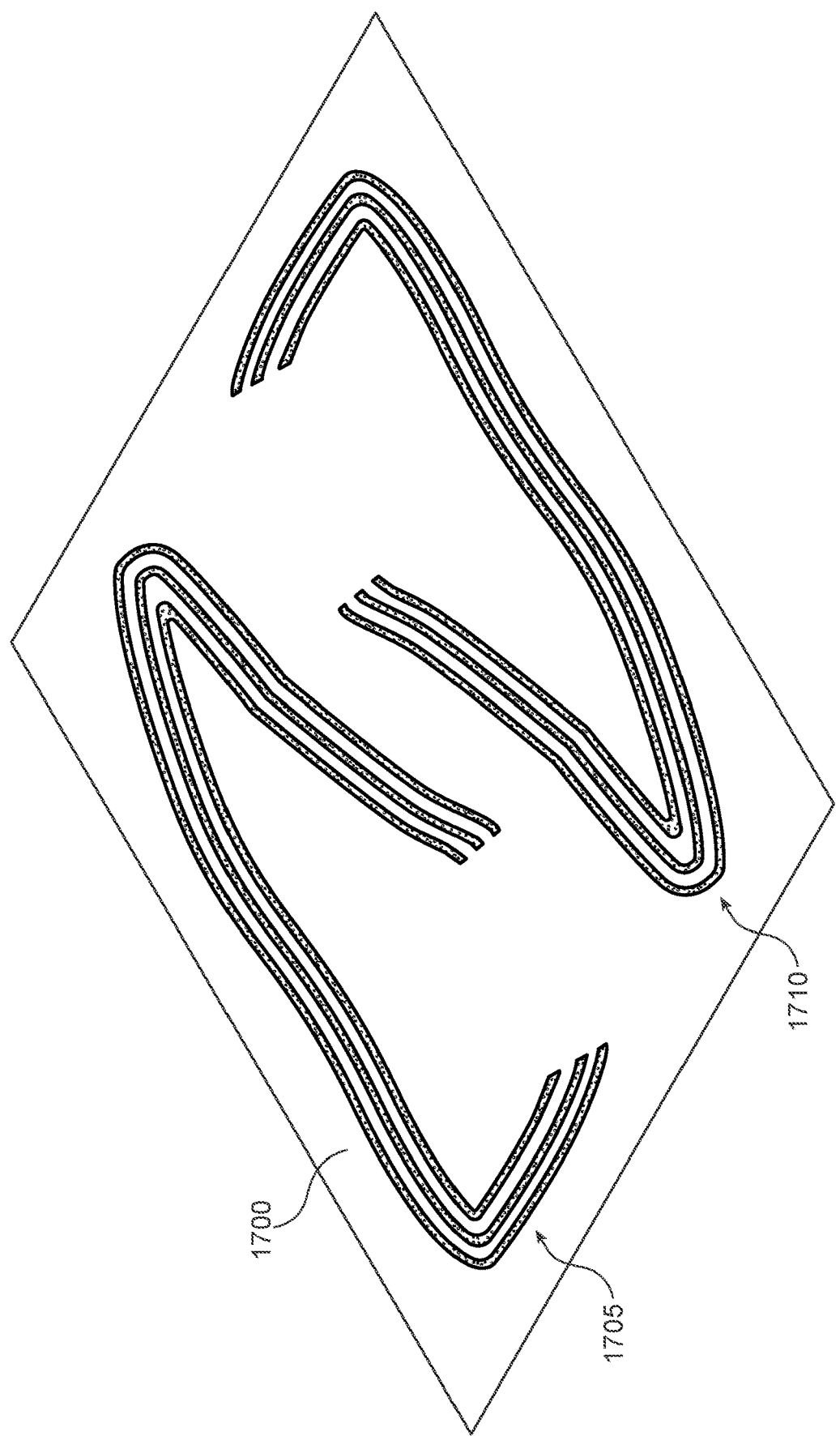
FIG. 17 is a schematic perspective view of two sets of nested uppers being formed on the same substrate sheet.

FIG. 17 is a schematic perspective view of two sets of nested uppers being formed on the same substrate sheet. For example, as shown in FIG. 17, the uppers may be formed oriented on their side. In particular, a substrate sheet 1700 may include a first set of uppers 1705 formed on their side, and a second set of uppers 1710 formed on their side. As illustrated in FIG. 17, these sets of uppers are arranged as shoes would be within a shoebox in order to maximize the use of substrate sheet 1700. In other embodiments, the nested uppers can also be formed in an orientation in which each upper is in its upright position, where the successively stacked substrate sheets are aligned in a vertical orientation of the uppers (i.e., bottom to top of each upper).

In some embodiments, multiple nested uppers may be formed using a spray-on polymer to form nonwoven polymer substrate sheets upon which the layers of multiple nested uppers may be formed. That is, the method illustrated in FIGS. 12A through 13 may be utilized to form multiple nested uppers instead of one flat upper. Accordingly, the substrate sheets upon which the multiple nested uppers are built may be formed using the spray-on process shown in FIG. 12A. Once the substrate sheets are formed, the uppers may be built upon the pre-formed sheets.

Figure 18:
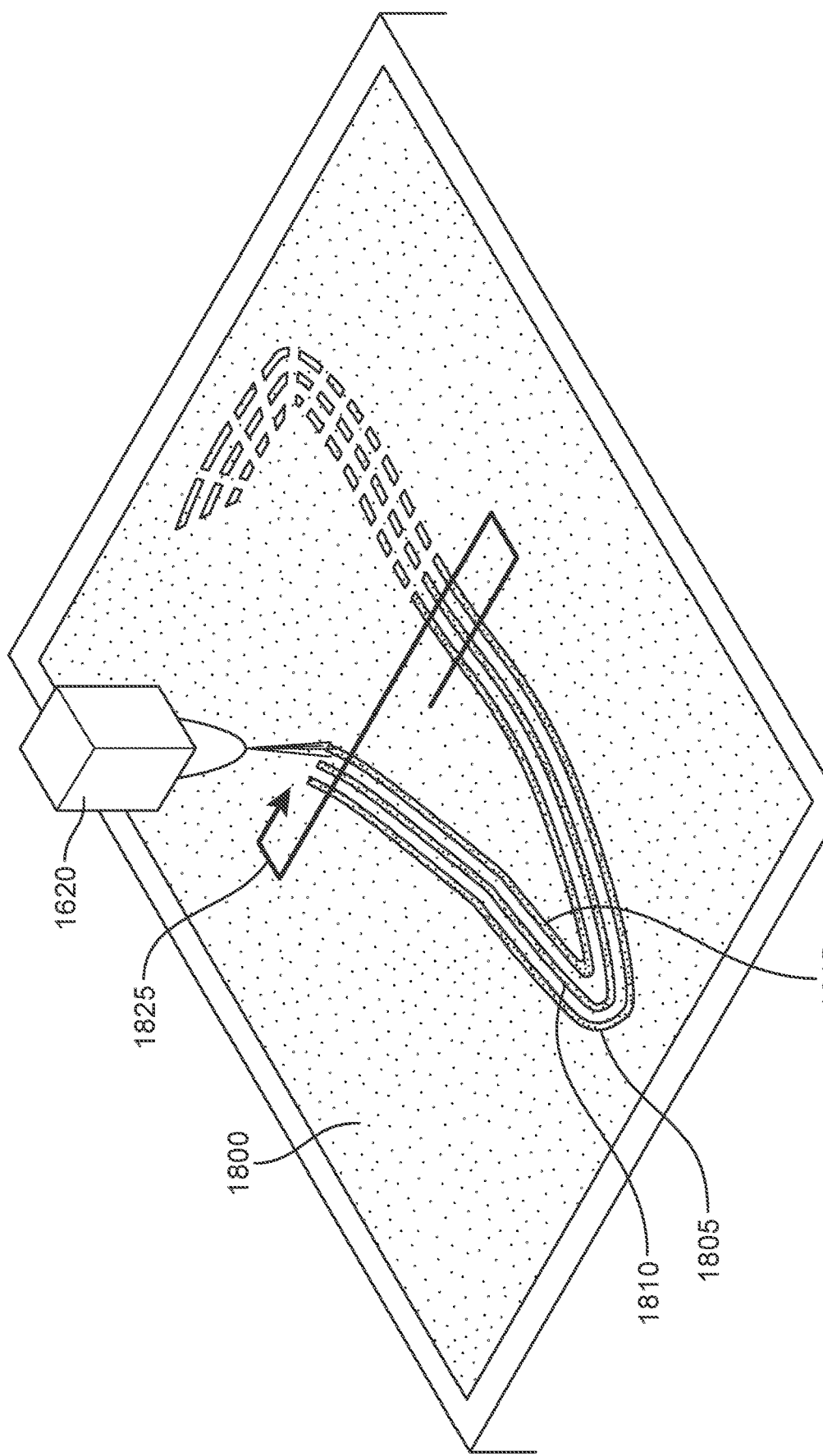
FIG. 18 is a schematic perspective view of multiple nested uppers being formed using a spray-on polymer substrate sheet.

FIG. 18 is a schematic perspective view of multiple nested uppers being formed using a spray-on polymer substrate sheet. As shown in FIG. 18, multiple nested uppers may be formed upon a nonwoven substrate sheet 1800 formed, for example, using the method shown in FIG. 12A. As shown in FIG. 18, the nested uppers may be formed by spraying liquid in a pattern. For example, as shown in FIG. 18, substrate sheet 1800 may have a liquid sprayed onto it (e.g., using an inkjet printer as described above) to form a first upper portion 1805, a second upper portion 1810, and a third upper portion 1815. A liquid spraying device 1620 is illustrated schematically, as is its path, which is shown by an arrow 1825. It will be noted that, for purposes of illustration, the layer shown in FIG. 18 is from a middle portion of the uppers. That is, the layer shown in FIG. 18 is not the first layer to be formed.

Figure 19:
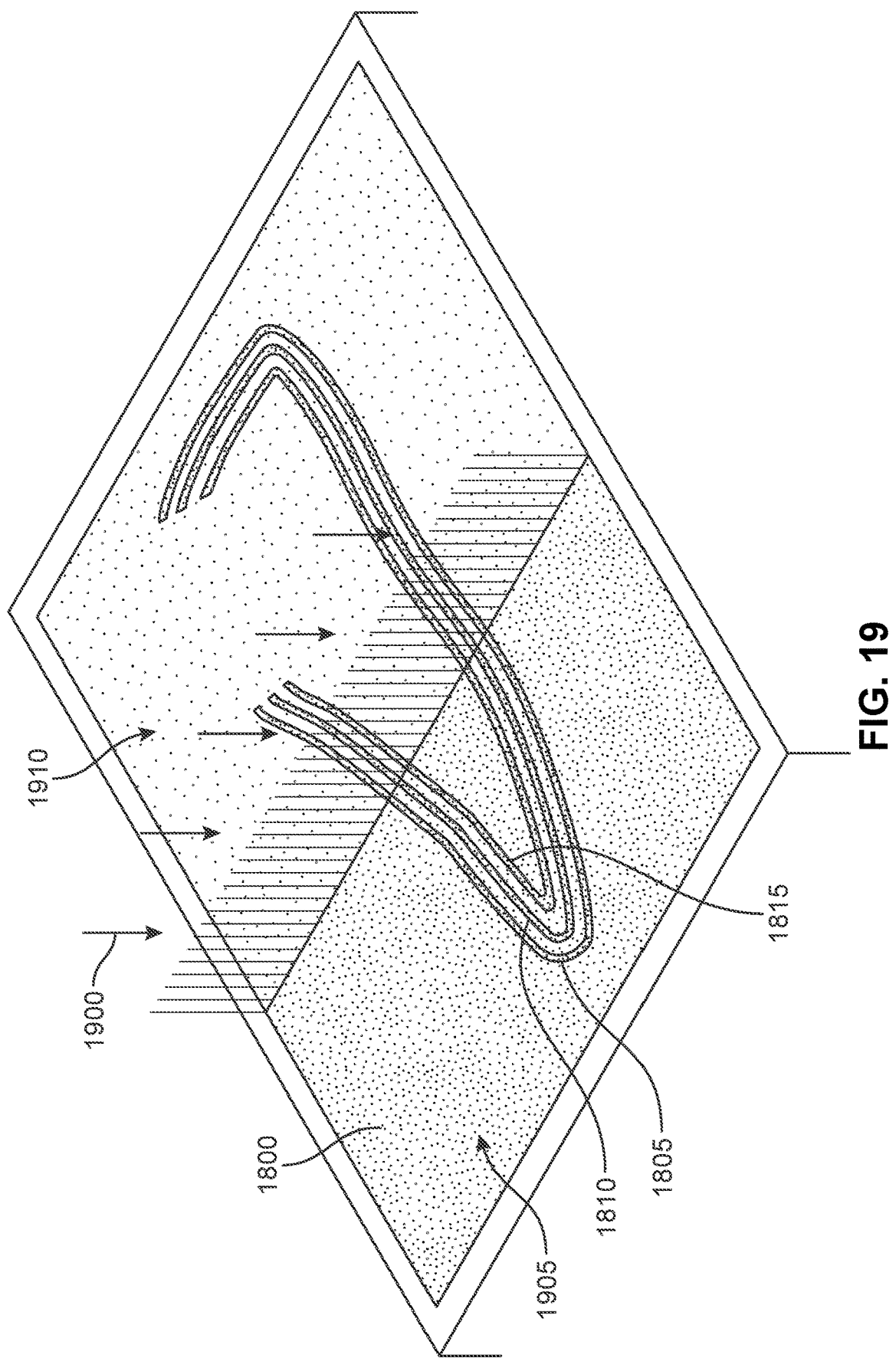
FIG. 19 is a schematic perspective view of powder being applied to the spray-on polymer substrate sheet.

As with the flat-formed uppers described above, subsequent to this liquid application process shown in FIG. 18, powder may be applied to substrate sheet 1800. FIG. 19 is a schematic perspective view of powder being applied to the spray-on polymer nonwoven substrate sheet. As illustrated by a plurality of arrows 1900 in FIG. 19, a powder is applied to substrate sheet 1800. FIG. 19 shows sheet 1800 approximately 40% covered with powder. That is, FIG. 19 shows a powdered portion 1905 and an unpowdered portion 1910.

Once the entire area occupied by the first upper portion 1805, second upper portion 1810, and third upper portion 1825 is covered with powder, the powder may be removed from the non-sprayed portions of substrate sheet 1800 to form powdered areas. Again, the powder sticks to the liquid sprayed areas, and thus, the powder in the liquid sprayed areas is not removed by the vacuuming process. An exemplary vacuuming process is shown in FIG. 12D and discussed above. A similar process may be used when forming multiple nested uppers.

Multiple sheets may be formed in a similar manner in order to form the multiple nested uppers in a type of additive manufacturing process. That is, multiple powdered sheets may be arranged in a stack and joined using heat and pressure as described above. The uncured portions of the joined stacks may then be removed using techniques such as media blasting, solvents, and/or melting. For the spaces between the multiple nested uppers, removal techniques such as solvents and/or melting may be utilized. In some cases, the same solvent that served as the carrier for the dissolved polymer material that was used to form the substrate sheet may be used to remove excess material, since the excess material is merely the areas of the same substrate sheet to which polymer powder did not stick.

As shown in FIG. 18, a layer of multiple nested uppers may be formed on a platform 1800 by spraying a solution containing the polymer dissolved in a solvent using a spraying device 1805, wherein the solvent evaporates when the solution is sprayed, leaving the polymer deposited in select areas to form the first polymer layer. As shown in FIG. 18, the layer may include a first upper portion 1810, a second upper portion, 1815, and a third upper portion 1820. The layer may also include spacer material, for example, in a first spacer area 1825 between first upper portion 1810 and second upper portion 1815. In addition, a second spacer area 1830 may be disposed between second upper portion 1815 and third upper portion 1820. Also, a third spacer area 1835 may be disposed in a central region within the area that will form the internal cavity of the innermost upper.

Additional layers may be formed by applying additional polymer by spraying a solution containing the additional polymer to form a stack of polymer layers. It will be noted that, for purposes of illustration, the layer shown in FIG. 18 is from a middle portion of the uppers. That is, the layer shown in FIG. 18 is not the first layer to be formed. The method may then use compression and heat to join the stack of polymer layers into a cured structure similar to the embodiments discussed above.

In some embodiments, different portions of one or more of the uppers may be formed to have different properties than other portions of the same upper. In some embodiments, the different properties are provided by using different quantities of sprayed-on polymer. In some cases, different amounts of polymer are applied by varying a conveying speed of a conveyor carrying a substrate upon which the polymer layers are formed. In some embodiments, different materials are used within the same upper to provide different properties.

FIG. 19 is a schematic perspective view of multiple nested uppers being formed using different spray-on polymers for different portions of the uppers. FIG. 19 shows a method of forming one or more of the nested uppers to have different properties in different areas. For example, as shown in FIG. 19, a set of uppers are formed on a platform 1900. A first portion 1905 of a first upper may be formed of a first sprayed-on polymer delivered by a first nozzle 1915, whereas a second portion 1910 of the first upper may be formed of a second sprayed-on polymer delivered by a second nozzle 1920. In the present case, the second portion 1910 may be in a rear portion of the upper which will be located in an Achilles tendon area of the footwear. This portion may be formed of a softer and/or more flexible material than the rest of the upper.

Figure 20:
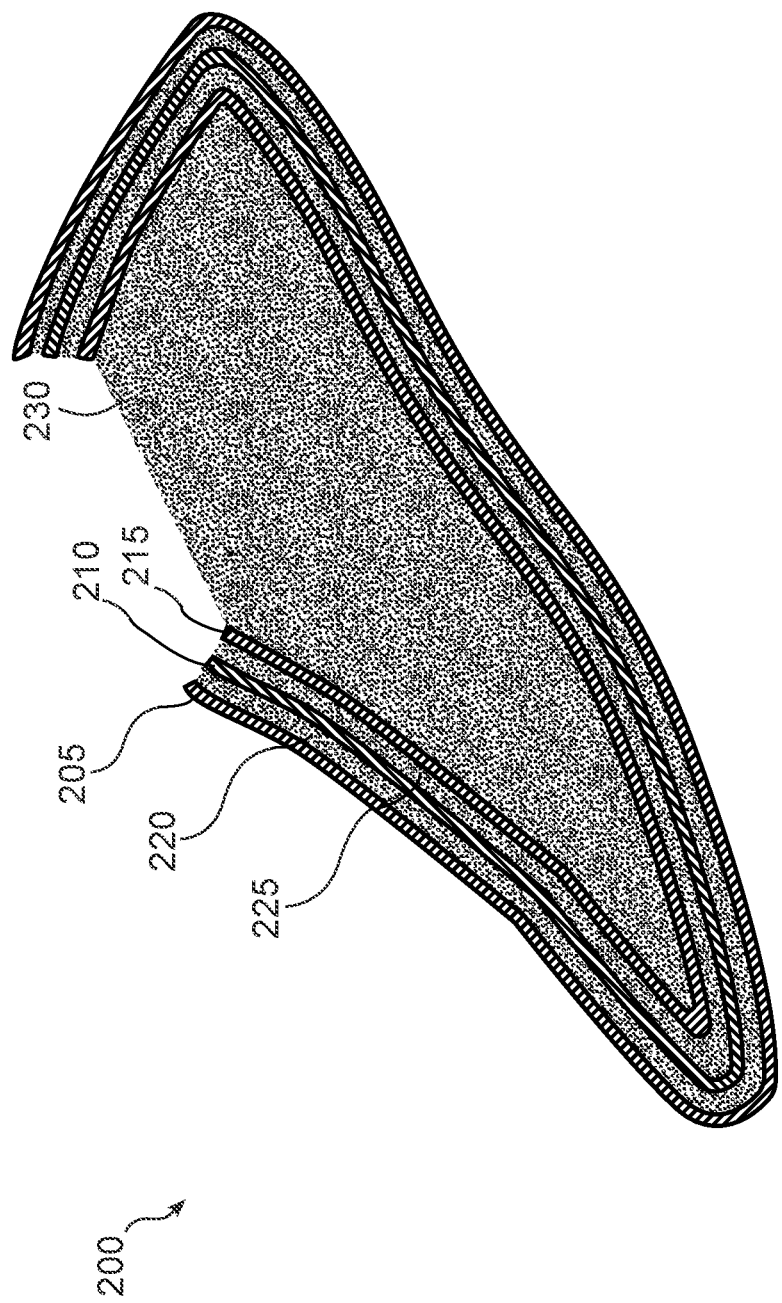
FIG. 20 is a schematic cutaway cross-sectional view of multiple uppers manufactured in a nested manner for a plurality of articles of footwear.

The embodiment of FIG. 20 shows an example of a plurality of nested uppers 200 being formed utilizing the process as described herein and depicted in FIGS. 16-19. In particular, FIG. 20 depicts a schematic cutaway cross-sectional view of multiple uppers manufactured in a nested manner for a plurality of articles of footwear. In particular, a first upper 205 may be formed as the outermost upper. A second upper 210 may be formed within and spaced from first upper 205. In addition, a third upper 215 may be formed within and spaced from second upper 210.

In order to provide spacing between the uppers, the arrangement may be formed with a spacer material between the layers, where the spacer material is subsequently removed to separate the nested uppers from each other. The spacer material can be formed from substrate and powder material that can be removed from the uppers in a manner similar to that previously described herein (e.g., via dissolving, media blasting, etc.). For example, a first spacer layer 220 may be formed between first upper 205 and second upper 210. A second spacer layer 225 may be formed between second upper 210 and third upper 215. In addition, in order to maintain the shape of the innermost layer (i.e., third upper 215), the inner cavity 230 may be filled with spacer material. It will be understood that the number of uppers formed in this nested manner may vary.

The embodiments herein are shown with three nested uppers, however, any number of uppers may be nested depending upon the thickness of each upper. In some embodiments, an entire size run (e.g., sizes 1-15, including half sizes) may be manufactured this way. In some embodiments, less than all of the sizes in the size run may be formed in a single set. For example, every other size may be formed together in order to increase spacing between each upper. For example, full sizes may be formed in one set of nested uppers, and half sizes may be formed in a second set of nested uppers. For similar reasons, in some cases, every third size may be formed together, which may provide even more spacing between uppers.

It will also be noted that, using this technique of nested uppers, in some cases, the sole portion of the upper may be integrally formed with the rest of the upper, as shown in FIG. 2. In other cases, only the sides, front, back, and top of the upper may be formed together. Also, while FIG. 2 illustrates the top portion, or vamp, of the upper integrally formed with the rest of the upper, a separate or selectively attached tongue may be formed instead, as desired.

Thus, in example embodiments depicted herein, a method of making an upper for an article of footwear comprises applying a liquid to select portions of a first substrate sheet of material, applying a powder to the first substrate sheet of material, applying suction to the first substrate sheet of material in order to remove the powder from portions of the first substrate sheet of material that are not coated with the liquid to form a selectively powdered sheet of material, applying additional liquid, additional powder, and additional suction to additional substrate sheets of material to form a stack of selectively powdered sheets of material, using compression and heat to join the stack of selectively powdered sheets of material into a partially cured structure, removing uncured portions of sheet material from the partially cured structure leaving a cured structure, wherein the cured structure is a substantially flat flexible sheet, and forming the flat flexible sheet into a three-dimensional upper for an article of footwear.

In additional example embodiments, a method of making an upper for an article of footwear comprises applying a liquid to select portions of a first substrate sheet of material, applying a powder to the first substrate sheet of material, applying suction to the first substrate sheet of material in order to remove the powder from portions of the first substrate sheet of material that are not coated with the liquid to form a selectively powdered sheet of material, applying additional liquid, additional powder, and additional suction to additional substrate sheets of material to form a stack of selectively powdered sheets of material, using compression and heat to join the stack of selectively powdered sheets of material into a partially cured structure, and removing uncured portions of sheet material from the partially cured structure leaving a cured structure. Different portions of the cured structure can have different properties.

In other example embodiments described herein, a method of making an upper for an article of footwear comprises applying a liquid to select portions of a first substrate sheet of material, applying a powder to the first substrate sheet of material, applying suction to the first substrate sheet of material in order to remove the powder from portions of the first substrate sheet of material that are not coated with the liquid to form a selectively powdered sheet of material, applying additional liquid, additional powder, and additional suction to additional substrate sheets of material to form a stack of selectively powdered sheets of material, using compression and heat to join the stack of selectively powdered sheets of material into a partially cured structure, and removing uncured portions of sheet material from the partially cured structure leaving a cured structure. The cured structure is a substantially flat flexible sheet configured to be formed into an upper of an article of footwear, and different portions of the substantially flat flexible sheet have different properties.

Media blasting is used to remove uncured portions of the partially cured structure. Alternatively, a solvent is used to dissolve uncured portions of the partially cured structure.

The different properties can be produced by two or more different powders. The different properties can be produced by using different amounts of powder in different areas. Different amounts of powder can be applied by varying a conveying speed of a conveyor carrying the sheets.

The different properties can be produced by using different materials for different substrate sheets of material.

A portion having a different property can include a heel counter that is more rigid than other portions of the upper.

Portions having a different property can include surface texture elements that are that are more compressible than other portions of the upper.

In further example embodiments, a method of making a sole plate for an article of footwear comprises applying a liquid to select portions of a first substrate sheet of material, applying powder, including one or more powder materials, to the first substrate sheet of material, applying suction to the first substrate sheet of material in order to remove the powder from portions of the first substrate sheet of material that are not coated with the liquid to form a selectively powdered sheet of material, applying additional liquid, additional powder, and additional suction to additional substrate sheets of material to form a stack of selectively powdered sheets of material, using compression and heat to join the stack of selectively powdered sheets of material into a partially cured structure, and removing uncured portions of sheet material from the partially cured structure leaving a cured structure. The cured structure includes a sole plate formed of different materials in different areas of the sole plate.

The different properties can be produced by two or more different powders. The different properties can also be produced by using different amounts of powder in different areas. Further, the different properties can be produced by using different materials for the additional sheets of material.

Media blasting can be used to remove uncured portions of the partially cured structure. A solvent can also be used to dissolve uncured portions of the partially cured structure.

In other example embodiments, a method of making an upper for an article of footwear comprises forming a first polymer layer by spray forming a nonwoven polymer sheet, spraying a liquid onto the nonwoven polymer sheet in select areas in the shape of a footwear upper, applying a polymer powder to the nonwoven polymer sheet, applying suction to remove polymer powder from unsprayed areas of the nonwoven polymer sheet, forming a plurality of additional polymer layers substantially similar to the first polymer layer and stacking the additional polymer layers with the first polymer layer to form a stack of polymer layers, and using compression and heat to join the stack of polymer layers into a cured structure. The cured structure is a substantially flat flexible sheet configured to be formed into an upper of an article of footwear.

Different portions of the uppers can be formed with different properties by using different sprayed-on polymers during the spray forming of the nonwoven polymer sheet. Different portions of the uppers can also be formed with different properties by using different quantities of sprayed-on polymer during spray forming of the nonwoven polymer sheet. Different amounts of polymer can be applied by varying a conveying speed of a conveyor carrying a substrate upon which the polymer layers are formed.

In further example embodiments as described herein, a method of simultaneously making multiple uppers for a plurality of articles of footwear comprises applying a liquid to select portions of a first substrate sheet of material, applying a powder to the first substrate sheet of material, applying suction to the first substrate sheet of material in order to remove the powder from portions of the first substrate sheet of material that are not coated with the liquid to form a selectively powdered sheet of material, applying additional liquid, additional powder, and additional suction to additional substrate sheets of material to form a stack of selectively powdered sheets of material, using compression and heat to join the stack of selectively powdered sheets of material into a partially cured structure, and removing uncured portions of sheet material from the partially cured structure leaving a cured structure. The cured structure includes multiple nested uppers for multiple articles of footwear.

Different powders can be applied to the substrate sheets of material, wherein one powder forms the uppers and one powder forms a spacer material between the uppers. Media blasting is used to remove uncured portions of the partially cured structure. A solvent can also be used to dissolve uncured portions of the partially cured structure.

Select sizes of a footwear size run can be formed by the cured structure, where different sized uppers are formed as part of the multiple nested uppers.

The articles of footwear can be formed oriented on their side. Two cured structures can be formed from the stack of selectively powdered sheets of material. In addition, two cured structures can be oriented opposite one another.

Forming the cured structure can include forming one or more of the nested uppers to have different properties in different areas. The different properties can be produced by two or more different powders.

The first and/or subsequent substrate sheets can further comprise a nonwoven polymer sheet formed by a spray forming process.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed:

1. A method of forming a plate for an article of footwear, comprising:
    applying a liquid to select portions of a first substrate sheet of material;
    applying a powder to the first substrate sheet of material;
    applying suction to the first substrate sheet of material in order to remove the powder from portions of the first substrate sheet of material that are not coated with the liquid to form a selectively powdered sheet of material;
    applying additional liquid, additional powder, and additional suction to one or more additional substrate sheets of material to form a stack of selectively powdered sheets of material;
    using compression and heat to join the stack of selectively powdered sheets of material into a partially cured structure; and
    removing uncured portions of sheet material from the partially cured structure leaving a cured structure.

2. The method of claim 1, wherein the cured structure is a substantially flat flexible sheet.

3. The method of claim 1, further comprising:
    spray forming a combination of polymer and/or carbon fibers and a binder on a surface to form a nonwoven sheet; and
    providing the nonwoven sheet as the first substrate sheet of material or as one of the one or more additional substrate sheets of material.

4. The method of claim 1, wherein different portions of the cured structure have different properties.

5. The method of claim 4, wherein applying additional powder to the one or more additional substrate sheets comprises applying two or more powders comprising different polymers to the different portions.

6. The method of claim 1, further comprising:
    forming an article of footwear with the cured structure.

7. The method of claim 4, wherein the different portions of the cured structure comprise a first portion formed from a first material and a second portion formed of a second material, the second portion being more rigid than the first portion.

8. The method of claim 7, wherein the second material comprises carbon and/or nylon.

9. A method of making an upper for an article of footwear, the method comprising:
    applying a liquid to select portions of a first substrate sheet of material, wherein the liquid is applied in nested patterns, each nested pattern defining a shape of an upper;
    applying a powder to the first substrate sheet of material;
    removing the powder from portions of the first substrate sheet of material that are not coated with the liquid;
    treating the powder to form cured portions along the nested patterns of the first substrate sheet of material; and
    incorporating at least one cured portion having the shape of a corresponding nested pattern with one or more other components to form an upper having the shape of the corresponding nested pattern.

10. The method of claim 9, further comprising:
separating uncured portions from the first substrate sheet of material, thereby leaving a cured structure.

11. The method of claim 10, wherein:
the powder is a polymer powder; and
treating comprises applying heat effective to melt the powder.

12. The method of claim 9, further comprising:
applying the liquid to select portions of a second substrate sheet of material;
applying the powder to the second substrate sheet of material;
removing the powder from portions of the second substrate sheet of material that are not coated with the liquid; and
stacking the first substrate sheet of material and the second substrate sheet of material to form a stack;
wherein treating further comprises treating the powder to form cured portions of the stack.

13. The method of claim 12, further comprising separating uncured portions of the first substrate sheet of material, thereby leaving a cured structure.

14. The method of claim 13, wherein:
the powder is a polymer powder; and
treating comprises applying heat effective to melt the powder and applying pressure effective to join the first substrate sheet of material to the second substrate sheet of material.

15. The method of claim 13, wherein removing comprises applying suction utilizing a vacuum device.

16. A method of making an upper for an article of footwear, comprising:
applying a liquid to select portions of a first substrate sheet of material, wherein the liquid is applied in nested patterns, each nested pattern defining a shape of an upper;
applying a powder to the liquid on the first substrate sheet of material;
treating the liquid and powder to form cured portions along the nested portions of the first substrate sheet of material;
separating uncured portions from the first substrate sheet of material, leaving a cured structure; and
incorporating at least one cured structure having the shape of a corresponding nested pattern with other one or more other components to form an upper having the shape of the corresponding nested pattern.

17. The method of claim 16, wherein:
the powder is a polymer powder; and
treating comprises applying heat effective to melt the powder.

18. The method of claim 16, further comprising applying suction utilizing a vacuum device.

19. The method of claim 16, wherein different portions of the cured structure have different properties.

20. The method of claim 19, wherein the different portions of the cured structure comprise a first portion formed from a first material and a second portion formed of a second material, the second portion being more rigid than the first portion.

* * * * *